(12) United States Patent
Wen et al.

(10) Patent No.: US 10,200,880 B2
(45) Date of Patent: Feb. 5, 2019

(54) BEAM ADJUSTMENT METHOD, USER EQUIPMENT, AND BASE STATION

(71) Applicant: HUAWEI TECHNOLOGIES CO., LTD., Shenzhen, Guangdong (CN)

(72) Inventors: Rong Wen, Chengdu (CN); Jia He, Chengdu (CN); Kunpeng Liu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 120 days.

(21) Appl. No.: 15/468,525

(22) Filed: Mar. 24, 2017

(65) Prior Publication Data
US 2017/0201892 A1     Jul. 13, 2017

Related U.S. Application Data

(63) Continuation of application No. PCT/CN2014/090121, filed on Oct. 31, 2014.

(51) Int. Cl.
*H04W 16/28* (2009.01)
*H04W 24/02* (2009.01)
(Continued)

(52) U.S. Cl.
CPC .......... *H04W 16/28* (2013.01); *H04B 7/063* (2013.01); *H04B 7/0691* (2013.01); *H04B 7/0695* (2013.01); *H04L 5/006* (2013.01)

(58) Field of Classification Search
None
See application file for complete search history.

(56) References Cited

U.S. PATENT DOCUMENTS

| 2010/0103044 A1* | 4/2010 | Hoshino | H04B 7/0617 342/372 |
| 2013/0182683 A1* | 7/2013 | Seol | H04W 72/04 370/335 |

(Continued)

FOREIGN PATENT DOCUMENTS

| CN | 103634037 A | 3/2014 |
| CN | 103746729 A | 4/2014 |

(Continued)

OTHER PUBLICATIONS

International Search Report, dated Jul. 17, 2015, in International Application No. PCT/CN2014/090121 (4 pp.).
Extended European Search Report, dated Sep. 22, 2017, in European Application No. 14905022.1 (10 pp.).

(Continued)

*Primary Examiner* — Duc T Duong
(74) *Attorney, Agent, or Firm* — Staas & Halsey LLP

(57) ABSTRACT

Embodiments of the present invention provide a beam adjustment method, user equipment, and a base station to resolve a problem of overlapping coverage, inter-beam interference. The method includes: sending, by a base station, beam information by using multiple beams, where the beam information includes a beam identifier and channel detection information that correspond to a beam; receiving the detection feedback information sent by the at least one user equipment; obtaining identifiers of Z beams carried in the detection feedback information, where Z is a positive integer greater than or equal to 1, and determining, in the Z beams, Z1 beams that need to be adjusted, where Z1 is a positive integer less than or equal to Z; and adjusting, for at least one time, Z1 antenna bays corresponding to the Z1 beams. The embodiments of the present invention are applied to beam adjustment.

20 Claims, 11 Drawing Sheets

(51) Int. Cl.
H04W 24/04 (2009.01)
H04B 17/12 (2015.01)
H04L 5/00 (2006.01)
H04B 7/06 (2006.01)

(56) References Cited

U.S. PATENT DOCUMENTS

| | | | |
|---|---|---|---|
| 2013/0235742 A1* | 9/2013 | Josiam | H04W 24/10 370/252 |
| 2015/0049824 A1* | 2/2015 | Kim | H04B 7/0456 375/267 |
| 2015/0237617 A1 | 8/2015 | Chen | |
| 2015/0351135 A1* | 12/2015 | Schmidt | H04W 76/10 455/450 |
| 2016/0197659 A1* | 7/2016 | Yu | H04W 16/28 370/335 |
| 2017/0033851 A1* | 2/2017 | Zhong | H04B 7/0413 |
| 2017/0237476 A1* | 8/2017 | Kim | H04B 7/0617 370/329 |

FOREIGN PATENT DOCUMENTS

| | | |
|---|---|---|
| EP | 2637321 A1 | 9/2013 |
| WO | WO2009137092 | 11/2009 |
| WO | WO2013144361 | 10/2013 |
| WO | 2014/169418 A1 | 10/2014 |

OTHER PUBLICATIONS

International Search Report dated Jul. 17, 2015, in International Application No. PCT/CN2014/090121 (4 pgs).

* cited by examiner

BEAM ADJUSTMENT METHOD, USER EQUIPMENT, AND BASE STATION

CROSS-REFERENCE TO RELATED APPLICATIONS

This application is a continuation of International Application No. PCT/CN2014/090121, filed on Oct. 31, 2014, the disclosure of which is hereby incorporated by reference in its entirety.

TECHNICAL FIELD

The present disclosure relates to the communications field, and in particular, to a beam adjustment method, user equipment, and a base station.

BACKGROUND

To further improve a system capacity and spectrum efficiency, a next generation high-frequency system further evolves in a direction of a dense network structure, wider bandwidth, and higher spatial multiplexing dimension extension. A millimeter-wave band includes rich spectrum resources. However, the millimeter-wave band has a relatively large space loss. To improve the system capacity and the spectrum efficiency, a most direct means is to use a large-scale antenna. For a large-scale antenna system, a larger antenna scale indicates a narrower beam. Therefore, to ensure user coverage, a base station needs to simultaneously transmit multiple beams to cover an entire sector. As shown in FIG. 1, an antenna unit of a base station is divided into N antenna bays. One antenna bay generates one beam, and there are N beams in total. As shown in FIG. 2, antenna bays of a base station generate N beams. There are multiple UEs (User Equipment) within sector coverage of the base station. Each UE is covered by one or more beams of the base station.

It is desirable that beams of the base station may cover the entire sector, and the beams do not overlap with each other. In this case, resources may be allocated, in a space division manner, to UEs within coverage of different beams, and resources may be allocated, in a frequency division/time division manner, to multiple UEs covered by a same beam. However, in a practical system, because a beam gain does not change suddenly, to ensure sector coverage, beams have an overlapping part. In this case, inter-beam interference may occur in UE located in an overlapping part of multiple beams. As shown in FIG. 3, UE 4, UE 5, and UE 6 receive signals sent by a beam i and a beam k. In this case, if strength of a signal received from each beam is relatively strong, beam signals interfere with each other, and cannot be distinguished from each other. If resources are not allocated to the UE 4, the UE 5, and the UE 6 to avoid interference, user experience is affected. In the prior art, to avoid interference between beams, the base station allocates the resources to the UE 4, the UE 5, and the UE 6 in a manner of scheduling the beam i and the beam k by means of time division. In this way, when the base station schedules the beam i, the beam k is in an idle state. Space diversity gains of two beams cannot be obtained simultaneously. As a result, the system capacity is reduced. In addition, an antenna bay is corresponding to relatively poor channel quality, and a signal-to-noise ratio (SNR) of a signal received by UE within coverage of a beam generated by the antenna bay cannot meet a signal transmission requirement. In this case, the antenna bay cannot serve the UE covered by the antenna bay. This causes a waste of resources.

SUMMARY

The present invention provides a beam adjustment method, user equipment, and a base station, to resolve a problem of overlapping coverage, inter-beam interference, or a waste of resources existing in allocation of beams sent by a base station.

To achieve the foregoing objective, the following technical solutions are provided in the embodiments of the present invention:

According to a first aspect, a beam adjustment method is provided, including:

sending, by a base station, beam information by using multiple beams, where the beam information includes a beam identifier and channel detection information that correspond to a beam, so that user equipment performs, according to the channel detection information, detection on a beam covering the user equipment, to obtain detection feedback information;

receiving the detection feedback information sent by the at least one user equipment;

obtaining identifiers of Z beams carried in the detection feedback information, where Z is a positive integer greater than or equal to 1, and determining, in the Z beams, Z1 beams that need to be adjusted, where Z1 is a positive integer less than or equal to Z; and adjusting, for at least one time, Z1 antenna bays corresponding to the Z1 beams.

According to a second aspect, a beam adjustment method is provided, including:

receiving, by user equipment, beam information that is sent by a base station by using a beam, where the beam information includes a beam identifier and channel detection information that correspond to the beam;

performing, according to the channel detection information, detection on M beams covering the user equipment, to obtain detection feedback information, where the detection feedback information includes identifiers of m beams, and m is a positive integer that is greater than or equal to 1 and less than or equal to M; and sending the detection feedback information to the base station, so that after receiving detection feedback information sent by the at least one user equipment, the base station obtains all identifiers of Z beams carried in the detection feedback information, determines, in the Z beams, Z1 beams that need to be adjusted, and adjusts, for at least one time, Z1 antenna bays corresponding to the Z1 beams, where Z is a positive integer greater than or equal to m, and Z1 is a positive integer less than or equal to Z.

According to a third aspect, a base station is provided, including:

a sending unit, configured to send beam information by using multiple beams, where the beam information includes a beam identifier and channel detection information that correspond to a beam, so that user equipment performs, according to the channel detection information, detection on a beam covering the user equipment, to obtain detection feedback information;

a receiving unit, configured to receive the detection feedback information sent by the at least one user equipment;

a parsing unit, configured to obtain identifiers of Z beams carried in the detection feedback information, where Z is a positive integer greater than or equal to 1;

a determining unit, configured to determine, in the Z beams, Z1 beams that need to be adjusted, where Z1 is a positive integer less than or equal to Z; and an adjustment unit configured to adjust, for at least one time, Z1 antenna bays corresponding to the Z1 beams.

According to a fourth aspect, user equipment is provided, including:

a receiving unit, configured to receive beam information that is sent by a base station by using a beam, where the beam information includes a beam identifier and channel detection information that correspond to the beam;

a detection unit, configured to perform, according to the channel detection information, detection on M beams covering the user equipment, to obtain detection feedback information, where the detection feedback information includes identifiers of m beams, and m is a positive integer that is greater than or equal to 1 and less than or equal to M; and a sending unit, configured to send the detection feedback information to the base station, so that after receiving detection feedback information sent by the at least one user equipment, the base station obtains all identifiers of Z beams carried in the detection feedback information, determines, in the Z beams, Z1 beams that need to be adjusted, and adjusts, for at least one time, Z1 antenna bays corresponding to the Z1 beams, where Z is a positive integer greater than or equal to m, and Z1 is a positive integer less than or equal to Z.

By using the foregoing solutions, the base station determines, by using detection feedback information sent by at least one user equipment, a beam that needs to be adjusted, and adjusts an antenna bay generating the beam, so as to reduce overlapping coverage of a beam generated by an adjusted antenna bay and reduce inter-beam interference, or make more beams meet a transmission threshold, improve a system capacity, and improve user experience.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the aft may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 4:
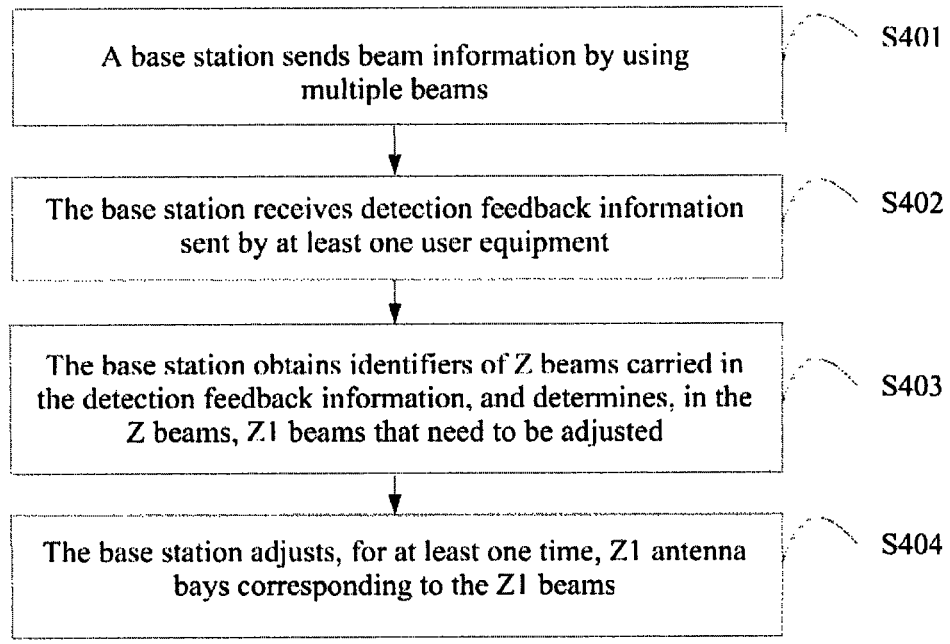
FIG. 4 is a schematic flowchart of a beam adjustment method according to an embodiment of the present invention.

An embodiment of the present invention provides a beam adjustment method. As shown in FIG. 4, the method includes the following steps.

S401. A base station sends beam information by using multiple beams.

The beam information includes a beam identifier and channel detection information that correspond to a beam, so that user equipment performs, according to the channel detection information, detection on a beam covering the user equipment, to obtain detection feedback information.

Optionally, in an existing high-frequency wireless communications system, the base station may send the beam information to the user equipment by using a high frequency band and/or a low frequency band.

Specifically after obtaining the channel detection information, any user equipment located within coverage of a beam sent by the base station performs detection on a beam covering the user equipment. For example, M beams cover the user equipment, and M is a positive integer greater than or equal to 1. In this case, the user equipment sends, to the base station by using the detection feedback information, identifiers of m beams that are in the M beams and that meet a condition. The identifiers of the m beams that meet the condition include an identifier of a beam that meets a signal transmission condition of the user equipment, and/or at least two beams whose signal-to-noise ratio SNR difference falls within a preset range, and/or an identifier of a beam whose SNR (signal-to-noise ratio) is less than a signal transmission threshold $SNR^{thd}$.

S402. The base station receives detection feedback information sent by at least one user equipment.

Detection feedback information sent by each user equipment carries an identifier of a beam that covers the user equipment and that meets the condition.

S403. The base station obtains identifiers of Z beams carried in the detection feedback information, and determines, in the Z beams, Z1 beams that need to be adjusted.

Herein Z is a positive integer greater than or equal to 1, and Z1 is a positive integer less than or equal to Z.

Specifically, the base station obtains a beam identifier from the detection feedback information sent by each user equipment. For example, two user equipments send detection feedback information to the base station, detection feedback information sent by first user equipment includes m1 beam identifiers, and detection feedback information sent by second user equipment includes m2 beam identifiers. In this case, if the m1 beam identifiers do not have a same beam identifier as the m2 beam identifiers, the base station may obtain Z=m1+m2 beams from the detection feedback information sent by the first user equipment and the second user equipment; or if the m1 beam identifiers have a same beam identifier as the m2 beam identifiers, the base station may obtain Z<m1+m2 beams from the detection feedback information sent by the first user equipment and the second user equipment.

Further, the following includes three manners in which the base station determines, in the Z beams, the Z1 beams that need to be adjusted:

In a first manner, when the Z beams include a beam that meets a signal transmission condition of the user equipment, and the detection feedback information includes channel quality information of the Z beams, the base station determines, in the Z beams according to the identifiers of the Z beams and the channel quality information of the Z beams, the Z1 beams that need to be adjusted due to overlapping coverage.

Figure 3:
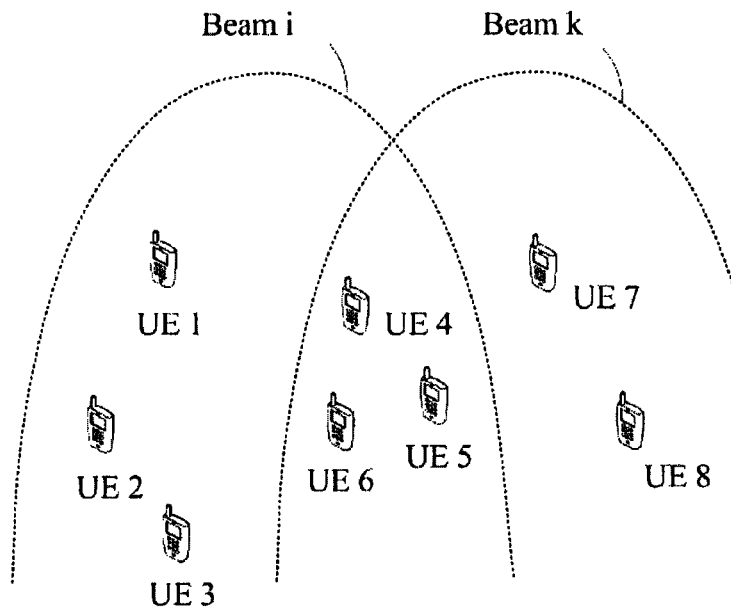
FIG. 3 is a schematic diagram of inter-beam interference according to an embodiment of the present invention.

Multiple beams that meet the signal transmission condition of the user equipment and that can be received by the user equipment overlap with each other in teens of coverage. As shown in FIG. 3, both a beam i and a beam k meet the signal transmission condition of the user equipment. Because the beam i and the beam k both cover UE 4, UE 5, and UE 6, detection feedback information sent to the base station by the UE 4 to the UE 6 includes an identifier of the beam i and an identifier of the beam k. In this case, the base station performs joint statistical analysis according to beam identifiers and beam channel quality information that are fed back by all the user equipments, and determines that beam adjustment needs to be performed on the beam i and the beam k due to overlapping coverage.

In a second manner, when the Z beams include at least two beams whose signal-to-noise ratio SNR difference falls within a preset range, and the detection feedback information includes channel quality information of the Z beams, the base station determines, in the Z beams according to the identifiers of the Z beams and the channel quality information of the Z beams, the Z1 beams that need to be adjusted due to inter-beam interference. Inter-beam interference exists between the at least two beans whose signal-to-noise ratio SNR difference falls within the preset range and that can be received by the user equipment.

In an optional implementation manner of this embodiment of the present invention, when all the multiple beams encountering the inter-beam interference are beams that do not meet the signal transmission condition of the user equipment, the base station may not adjust the multiple beams because all the multiple beams cannot serve the user equipment. The present invention sets no limitation thereto.

In another optional implementation manner of this embodiment of the present invention, the multiple beams encountering the inter-beam interference include a beam that does not meet the signal transmission condition of the user equipment, and also include a beam that meets the signal transmission condition of the user equipment, or the multiple beams encountering the inter-beam interference are beams that meet the signal transmission condition of the user equipment.

As shown in FIG. 3, the beam i meets the signal transmission condition of the user equipment, and the beam k does not meet the signal transmission condition of the user equipment but interferes with the beam i. For example, an SNR of the beam i is greater than the $SNR^{thd}$, an SNR of the beam k is less than the $SNR^{thd}$, and an SNR difference between the beam i and the beam k falls within a specific interference range. In this case, detection feedback information sent to the base station by the UE 4 to the UE 6 all includes an identifier of the beam i and an identifier of the beam k. In this case, the base station performs joint statistical analysis according to beam identifiers and beam channel quality information that are fed back by all the user equipments, and determines that beam adjustment needs to be preformed on the beam i and the beam k due to inter-beam interference.

In a third manner 3, when the Z beams include a beam whose signal-to-noise ratio SNR is less than a signal transmission threshold $SNR^{thd}$, and the detection feedback information includes channel quality information of the Z beams, the base station determines, in the Z beams according to the identifiers of the Z beams and the channel quality information of the Z beams, the Z1 beams that require channel quality adjustment.

Specifically, when any user equipment detects that an SNR of a first beam covering the equipment is less than the signal transmission threshold $SNR^{thd}$, the user equipment feeds back an identifier of the first beam to the base station. The base station determines an adjacent antenna bay of a first antenna bay corresponding to the first beam. If a signal-to-noise ratio SNR of a beam corresponding to the adjacent antenna bay is greater than the signal transmission threshold $SNR^{thd}$, the base station determines that the first beam and the beam corresponding to the adjacent antenna bay are the Z1 beams that require channel quality adjustment.

In this way, when a beam that meets the signal transmission condition of the user equipment does not exist, the user equipment may feed back an identifier of a beam with a maximum SNR in beams covering the user equipment to the base station. In this case, the beam with the maximum SNR is the foregoing first beam.

It should be noted that the foregoing three manners are three manners in which the base station determines, according to different feedback manners of the user equipment, the Z1 beams that need to be adjusted. In specific implementation, the user equipment may carry, in the detection feedback information, at least one of an identifier of a beam encountering overlapping coverage, an identifier of a beam encountering inter-beam interference, or an identifier of a beam whose SNR is less than the signal transmission threshold $SNR^{thd}$. In this way, the base station performs analysis in at least one of the foregoing three manners according to feedback of the at least one user equipment to determine a problem in beam allocation. When analyzing the problem in beam allocation, the base station may use a total capacity of a local area as a principle, and/or use user experience as a principle.

In addition, the base station may further simultaneously determine, in the Z beams, other Z2 beams that need to be adjusted. The Z2 beams do not have a same beam as the Z1 beams, and a problem in beam allocation of the Z2 beams may be different from a problem in beam allocation of the Z1 beams. For example, the Z1 S beams are a beam 1, a beam 2, and a beam 3 that are adjacent to each other, and an SNR corresponding to the beam 1 is less than the $SNR^{thd}$; and therefore, channel quality adjustment needs to be performed. The Z2 beams are a beam 4 and a beam 5. The beam 4 and the beam 5 cover same user equipment, and need to be adjusted due to overlapping coverage S404. The base station adjusts, for at least one time, Z1 antenna bays corresponding to the Z1 beams.

For example, a beam identifier of each beam sent by the base station is preset, and a correspondence between a beam identifier of each beam and an antenna bay generating the beam is stored in the base station. After determining the Z1 beams that need to be adjusted, the base station determines, according to identifiers of the Z1 beams, antenna bays generating the Z1 beams.

Further, for the foregoing first manner and second manner, in a possible implementation manner of this embodiment of the present invention, if the Z1 antenna bays generating the Z1 beams are adjacent to each other, the base station combines the Z1 antenna bays into a joint antenna bay and a joint beam generated by using the joint antenna bay covers the user equipment.

Figure 5:
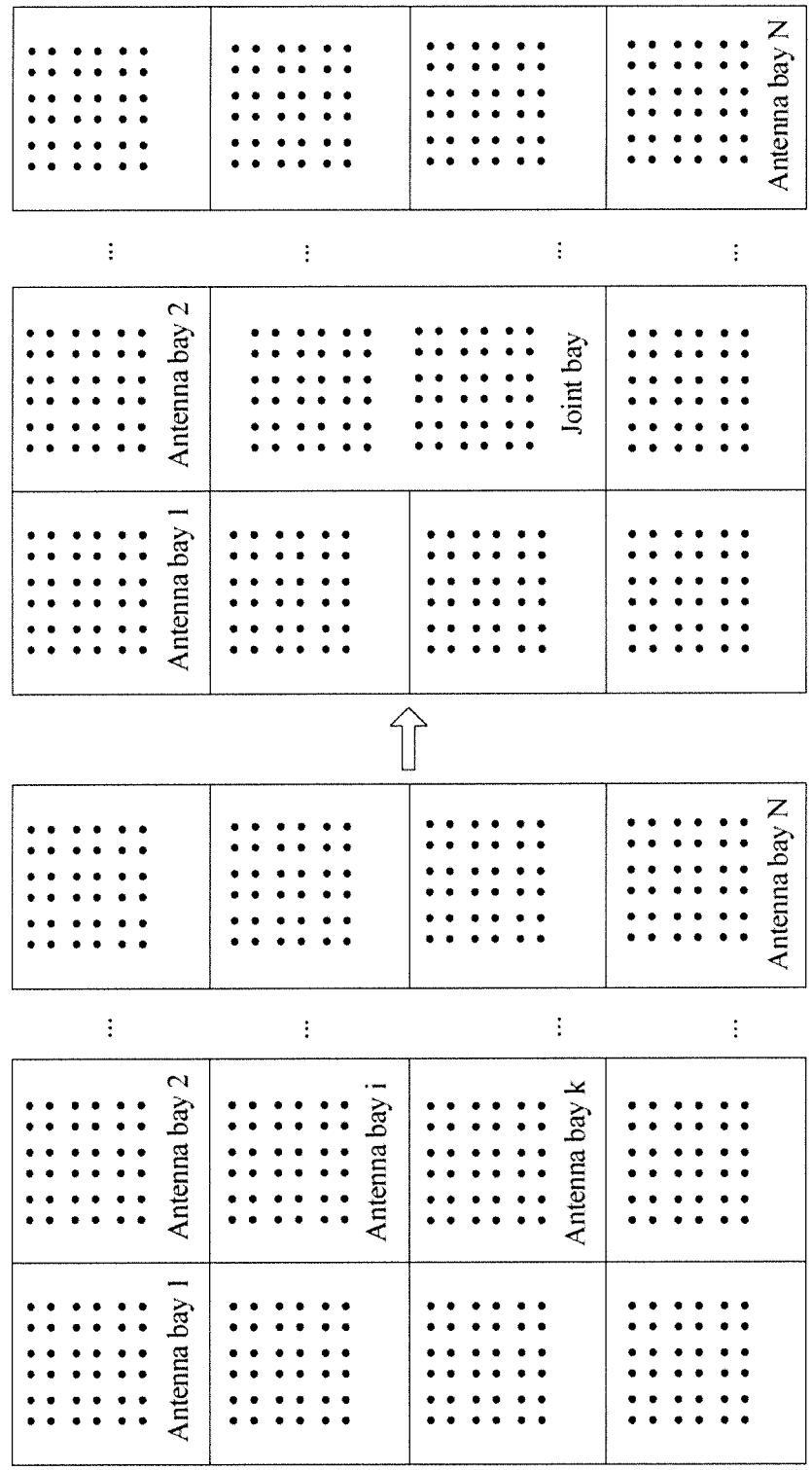
FIG. 5 is a schematic diagram of combining adjacent antenna bays into a joint bay according to an embodiment of the present invention.
Figure 6:
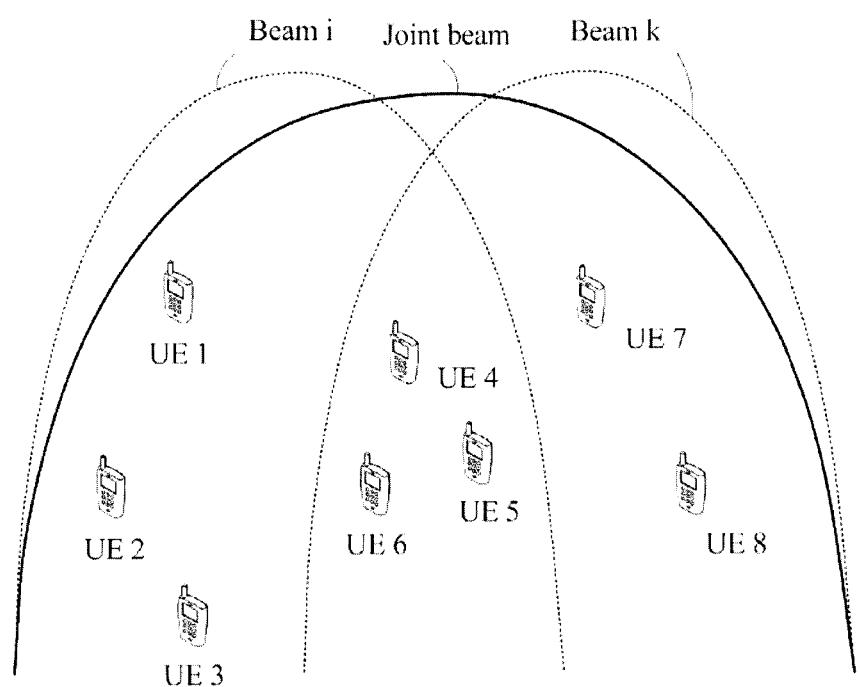
FIG. 6 is a schematic diagram of beam coverage before and after beam allocation adjustment according to an embodiment of the present invention.

For example, the detection feedback information sent to the base station by the at least one user equipment includes a beam i and a beam k, and the base station determines that overlapping coverage or inter-beam interference exists between the beam i and the beam k. The base station determines, according to an identifier of the beam i and an identifier of the beam k, an antenna bay i generating the beam i and an antenna bay k generating the beam k. As shown in FIG. 5, the antenna bay i is adjacent to the antenna bay k. The base station combines an array element of the antenna bay i and an array element of the antenna bay k into a new joint bay, and a beam generated by the joint bay covers the user equipment. In this case, as shown in FIG. 6, user equipment UE 4, UE 5, and UE 6 that are originally covered by a beam i and a beam k are covered by a joint beam. In this way, overlapping coverage and inter-beam interference are avoided, and user experience of the UE 4, the UE 5, and the UE 6 are ensured.

The foregoing is only an example for illustration. In practical application, user equipment may be covered by at least two beams. In this case, beam identifiers fed back to the base station by the user equipment include at least two beam identifiers, and the base station may combine at least two adjacent antenna bays into one antenna bay. The present invention sets no limitation thereto.

In another possible implementation manner of this embodiment of the present invention, the base station reallocates array elements of the Z1 antenna bays to form U antenna bays with different beam widths, and U is a positive integer greater than or equal to 2.

Figure 7:
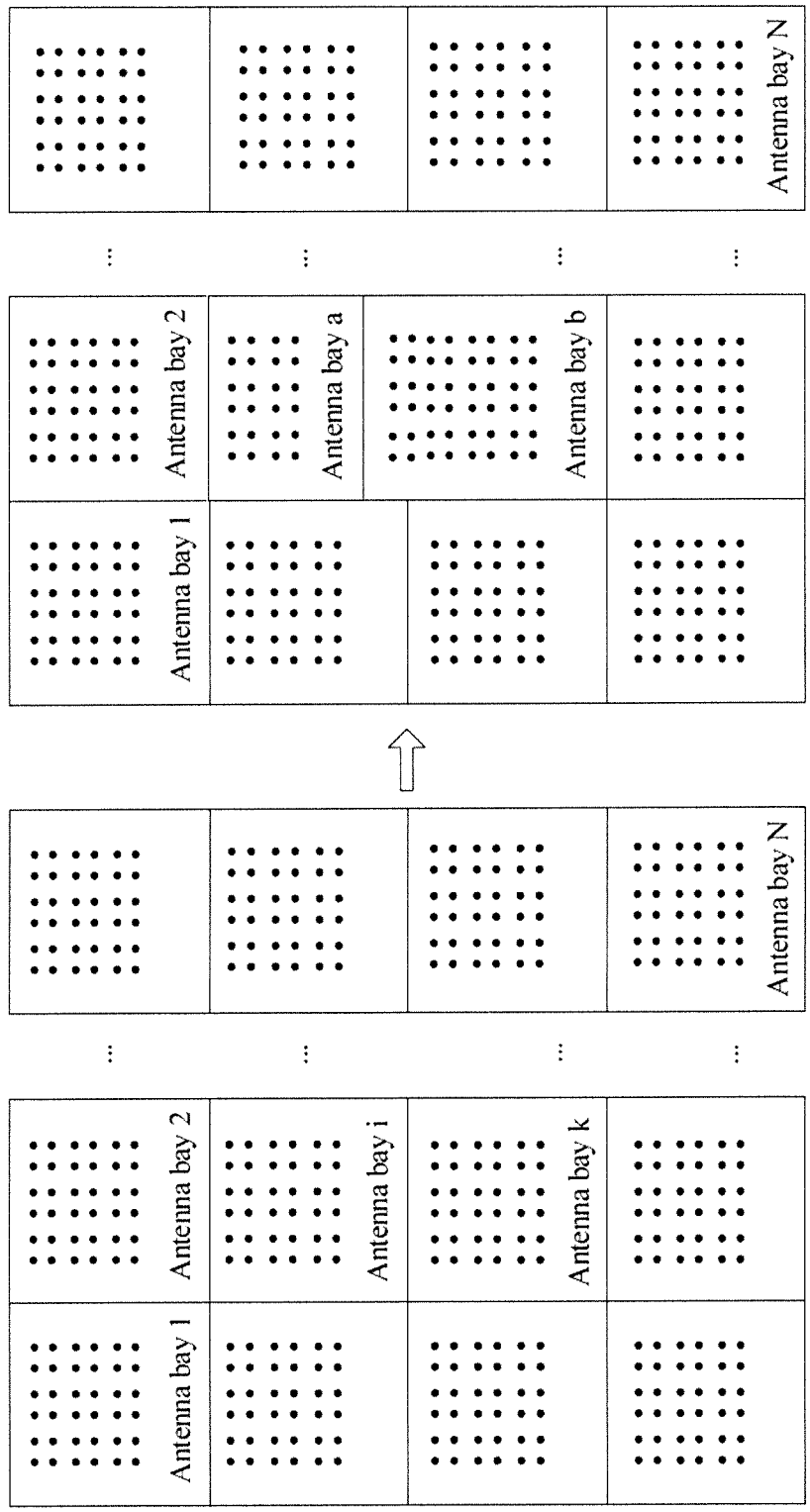
FIG. 7 is a schematic diagram of reallocating array elements of an antenna bay according to an embodiment of the present invention.
Figure 8:
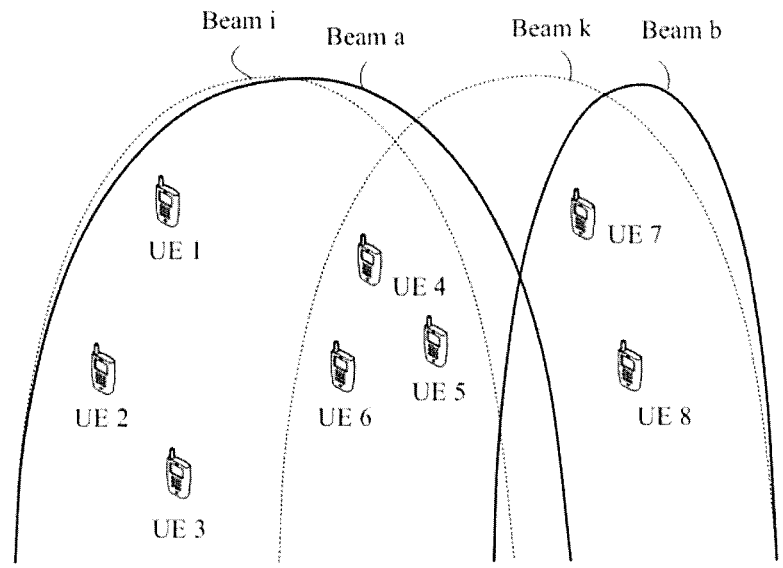
FIG. 8 is another schematic diagram of beam coverage before and after beam allocation adjustment according to an embodiment of the present invention.

For example, the detection feedback information sent to the base station by the at least one user equipment includes a beam i and a beam k, and the base station determines that overlapping coverage or inter-beam interference exists between the beam i and the beam k. The base station determines, according to an identifier of the beam i and an identifier of the beam k, an antenna bay i generating the beam i and an antenna bay k generating the beam k. As shown in FIG. 7, the antenna bay i is adjacent to the antenna bay k. The base station reallocates an array element of the antenna bay i and an array element of the antenna bay k, allocates fewer array elements to the antenna bay i to form a new antenna bay a, and allocates more array elements to the antenna bay k to form a new antenna bay b. A beam a generated by the antenna bay a and a beam b generated by the antenna bay b cover user equipment. As shown in FIG. 8, the beam i originally covers user equipment UE 1 to UE 6, and the beam k originally covers user equipment UE 4 to UE 8, while in this case, the beam a covers the user equipment UE 1 to UE 6, and the beam b covers the user equipment UE 7 and UE 8. In this way, the user equipment UE 4, UE 5, and UE 6 that are originally covered by the beam i and the beam k are covered by the beam a, so that overlapping coverage and inter-beam interference are avoided, and user experience of the UE 4, the UE 5, and the UE 6 are ensured.

The foregoing is only an example for illustration. The base station adjusts two beams with same beam width to a wide beam and a narrow beam. A quantity of newly generated beams obtained after the adjustment is not limited in this embodiment of the present invention. For example, the base station may regroup. into three antenna bays, antenna bays corresponding to the two beams.

In another possible implementation manner of this embodiment of the present invention, if the Z1 antenna bays generating the Z1 beams are not adjacent to each other, the base station adjusts a beamforming algoritlun of the Z1 non-adjacent antenna bays to change beam widths and/or beam directions of beams generated by the Z1 antenna bays.

Figure 9:
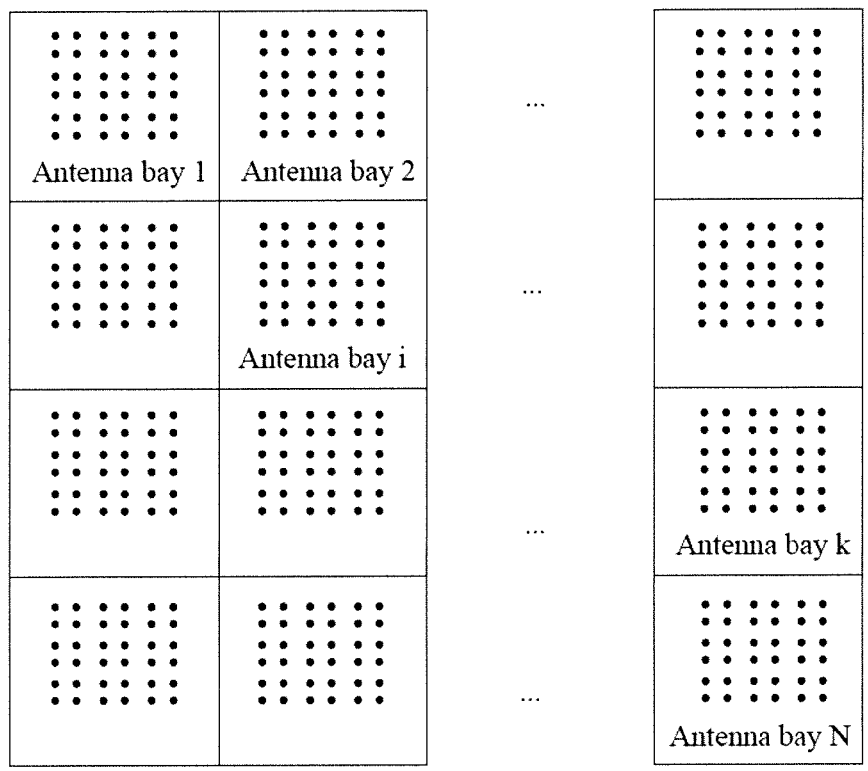
FIG. 9 is a schematic diagram of adjustment of a non-adjacent antenna bay according to an embodiment of the present invention.

For example, the detection feedback information sent to the base station by the at least one user equipment includes a beam i and a beam k, and the base station determines that overlapping coverage or inter-beam interference exists between the beam i and the beam k. The base station determines, according to an identifier of the beam i and an identifier of the beam k, an antenna bay i generating the beam i and an antenna bay k generating the beam k. As shown in FIG. 9, the antenna bay i is not adjacent to the antenna bay k. In this case, the base station may separately adjust beam directions and/or beam widths of the beam i and the beam k by using a beamforming algorithm. As shown in FIG. 8, the beam a is a beam generated after the beamforming algorithm of the antenna bay i is adjusted, and the beam b is a beam generated after the beamfomfing algorithm of the antenna bay k is adjusted.

Optionally, for the foregoing third manner, the base station reallocates array elements of the Z1 antenna bays, and increases a quantity of array elements of the first antenna bay whose SNR is less than the $SNR^{thd}$, so that the SNR of the first beam generated by the first antenna bay is greater than the $SNR^{thd}$, and an SNR of a beam corresponding to the adjacent antenna bay of the first adjusted antenna bay is still greater than the $SNR^{thd}$.

It should be noted that: beams generated by different antenna bays are corresponding to different channel quality, due to different channel fading and path losses. For an antenna bay corresponding to a channel with relatively good channel quality, a signal-to-noise ratio received by user equipment within coverage of a beam generated by the antenna bay meets a signal transmission requirement. For example, the SNR received by the user equipment is greater than the signal transmission threshold $SNR_{thd}$. However, for an antenna bay corresponding to a channel with relatively poor channel quality, a signal-to-noise ratio received by user equipment within coverage of a beam generated by the antenna bay does not meet the signal transmission requirement. For example, the signal-to-noise ratio SNR received by the user equipment is less than the signal transmission threshold $SNR_{thd}$. In this case, the antenna bay cannot serve the user equipment covered by the antenna bay, and resources are wasted.

However, in this embodiment of the present invention, when detecting a beam identifier of a beam covering user equipment, the user equipment may simultaneously detect, according to channel detection information, channel quality corresponding to each beam, and send, to a base station, detection feedback information carrying a beam identifier of each beam and channel quality information that corresponds to each beam. In this way, the base station may learn of, according to the beam identifier, an antenna bay corresponding to the beam covering the user equipment, and may learn of, according to the channel quality information, channel quality corresponding to the antenna bay. In this way, for user equipment whose beam does not meet a signal transmission condition of the user equipment, the base station may enhance channel quality of a beam with a maximum SNR in the beams covering the user equipment, so that the beam with the maximum SNR meets the signal transmission condition and serves the user equipment. Therefore, a waste of resources is avoided.

Figure 10:
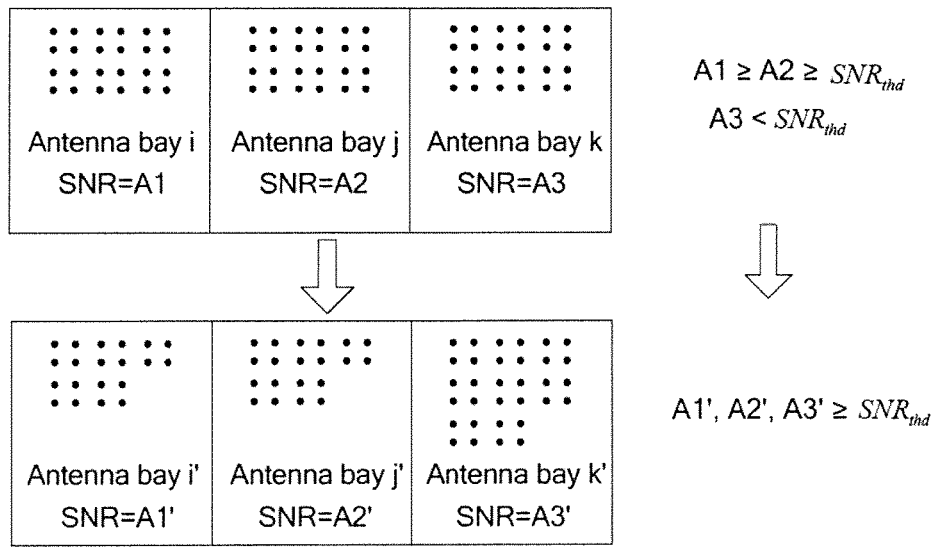
FIG. 10 is a schematic diagram of channel quality corresponding to a beam before and after adjustment according to an embodiment of the present invention.

FIG. 10 is used as an example for illustration. If an antenna bay i, an antenna bay j, and an antenna bay k that cover the user equipment are adjacent to one another, and the base station determines, according to the channel quality information, that an SNR corresponding to the antenna bay i is A1, an SNR corresponding to the antenna bay j is A2, an SNR corresponding to the antenna bay k is A3, and $A1 \geq A2 \geq SNR_{thd} > A3$, because a signal-to-noise ratio SNR corresponding to the antenna bay k is less than the signal transmission threshold $SNR_{thd}$, the antenna bay k cannot serve the user equipment covered by the antenna bay k. In this case, the base station reallocates array elements of the antenna bay i, the antenna bay j, and the antenna bay k, and allocates more array elements to the antenna bay k, and allocates fewer array elements to the antenna bay i and the antenna bay j, so as to form three new antenna bays i', j', and k'. Beams generated by the antenna bay i', the antenna bay j', and the antenna bay k' cover the user equipment.

It should be noted that after performing adjustment for one time, the base station may continue to instruct the user equipment to perform beam detection, and may receive channel quality corresponding to the three new antenna bays i', j', and k' sent by the user equipment, that is, A1', A2', and A3' shown in FIG. 10. The base station determines whether A1'. A2', and A3' are all greater than or equal to the signal transmission threshold $SNR_{thd}$. If A1', A2', and A3' are all greater than or equal to the signal transmission threshold $SNR_{thd}$, adjustment is stopped: or if A1', A2', and A3' are all less than the signal transmission threshold $SNR_{thd}$, the base station continues to reallocate array elements of the antenna bays i', j', and k', until all SNRs corresponding to newly generated antenna bays are greater than or equal to the signal transmission threshold $SNR_{thd}$.

In addition, in a possible implementation manner of this embodiment of the present invention, the base station may preset a threshold quantity of adjustment times, and count a quantity of adjustment times in a beam adjustment process. When the quantity of adjustment times reaches the threshold quantity of adjustment times, if an SNR of an adjusted beam is still less than the signal transmission threshold $SNR_{thd}$, the base station performs resource allocation according to a result obtained after the last time adjustment.

Specifically, after each time of beam allocation adjustment, the base station sends the beam information by using the adjusted beam, to continue to instruct the user equipment to perform beam detection, and performs adjustment for multiple times until the base station determines, according to detection information fed back by the user equipment, that a beam that needs to be adjusted does not exist in the Z beams, or a quantity of adjustment times of the base station reaches a preset threshold quantity of adjustment times. In this case, the base station stops beam adjustment, and sends beam acknowledgement information to all user equipments within beam coverage of the base station, so that after receiving the beam acknowledgement information, the user equipment stops the beam detection and information feedback. In this way, mutual acknowledge between the base station and the user equipment is completed, and subsequent resource allocation and data communication processes may be performed.

According to the foregoing method, a base station determines, by using detection feedback information sent by at least one user equipment, a beam that needs to be adjusted, and adjusts an antenna bay generating the beam, so as to reduce overlapping coverage of a beam generated by the adjusted antenna bay, reduce inter-beam interference, or make more beams meet a signal transmission threshold, improve a system capacity, and improve user experience.

Figure 11:
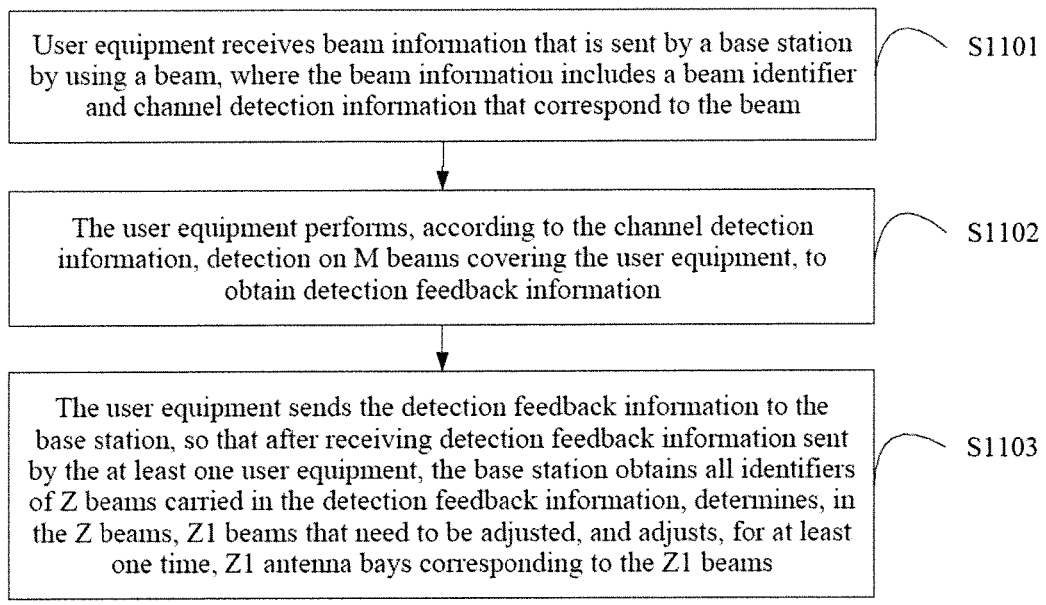
FIG. 11 is a schematic flowchart of another beam adjustment method according to an embodiment of the present invention.

An embodiment of the present invention provides a beam adjustment method. As shown in FIG. 11, the method includes the following steps:

S1101. User equipment receives beam information that is sent by a base station by using a beam.

The beam information includes a beam identifier and channel detection information that correspond to the beam.

It should be noted that preferably, channel detection information of a beam is irrelevant to that of another beam.

S1102. The user equipment performs, according to the channel detection information, detection on M beams covering the user equipment, to obtain detection feedback information.

The detection feedback information includes identifiers of m beams, and in is a positive integer that is greater than or equal to 1 and less than or equal to M.

Optionally, the user equipment detects, in the M beams, a beam that meets a signal transmission condition of the user equipment. For example, the user equipment detects channel quality of a first beam covering the user equipment. If the channel quality of the first beam meets the signal transmission condition, the user equipment obtains a beam identifier of the first beam from beam information corresponding to the first beam, and the first beam is any beam covering the user equipment. When the user equipment completes detection of all beams covering the user equipment, the user equipment sends, to the base station by using the detection feedback information, a beam identifier of the beam that meets the signal transmission condition of the user equipment and the channel quality information of each beam.

Optionally, the user equipment detects, in the M beams, at least two beams whose signal-to-noise ratio SNR difference falls within a preset range. For example, there are two beams covering the user equipment. The user equipment may determine whether an SNR difference between a beam 1 and a beam 2 falls within a preset difference range, to determine whether inter-beam interference exists between the beam 1 and the beam 2. If an SNR of the beam 1 approximates to that of the beam 2, the inter-beam interference exists between the beam 1 and the beam 2.

Optionally, the user equipment detects, in the M beams, a beam whose signal-to-noise ratio SNR is less than a signal transmission threshold $SNR^{thd}$, and sends, to the base station by using the detection feedback information, the channel quality information of each beam and an identifier of the beam whose signal-to-noise ratio SNR is less than the signal transmission threshold $SNR^{thd}$.

It should be noted that for the foregoing three optional feedback manners, the user equipment may perform one of the three feedback manners. For example, the user equipment only feeds back an identifier of a beam with overlapping coverage. In this case, the base station determines, in the first manner described in step S403 in the previous method embodiment of the present invention, the Z1 beams that need to be adjusted. In addition, the user equipment may also perform multiple manners in the foregoing three optional feedback manners, and the base station determines, in the first manner to the third manner described in step S403 in the previous method embodiment of the present invention, the Z1 beams that need to be adjusted. The present invention sets no limitation thereto. For example, the user equipment feeds back an identifier of a beam with overlapping coverage and an identifier of a beam encountering inter-beam interference. In this case, for user equipment covered by three beams, if the user equipment determines, by means of detection, that a beam 1 and a beam 2 meet a signal transmission condition, and a beam 3 does not meet the signal transmission condition, the user equipment does not need to determine whether the beam 1 interferes with the beam 2, and needs to only determine whether the beam 3 interferes with the beam 1 and the beam 2. If the beam 3 interferes with the beam 1 and the beam 2, the user equipment feeds back an identifier of the beam 1, an identifier of the beam 2, and an identifier of the beam 3.

S1103. The user equipment sends the detection feedback information to the base station, so that after receiving detection feedback information sent by at least one user equipment, the base station obtains all identifiers of Z beams carried in the detection feedback information, determines, in the Z beams, Z1 beams that need to be adjusted, and adjusts, for at least one time, Z1 antenna bays corresponding to the Z1 beams.

It should be noted that the base station may receive detection feedback information sent by multiple user equipments. The user equipments may be covered by different quantities of beams, and the user equipments may feed back different quantities of beam identifiers. That is, different user equipments may be corresponding to different M values and m values.

Herein Z is a positive integer greater than or equal to in, and Z1 is a positive integer less than or equal to Z.

Specifically, for a process in which the base station adjusts beam allocation according to the detection feedback information sent by the user equipment, reference may be made to descriptions corresponding to FIG. 5 to FIG. 10 in the previous method embodiment of the present invention, and details are not described herein again.

Optionally, the user equipment receives beam acknowledgement information sent by the base station, and stops beam detection according to the beam acknowledgement information.

Specifically, after each time of beam allocation adjustment, the base station sends the beam information by using the adjusted beam, to continue to instruct the user equipment to perform beam detection, and performs adjustment for multiple times until the base station determines, according to detection information fed back by the user equipment, that a beam that needs to be adjusted does not exist in the Z beams, or a quantity of adjustment times of the base station reaches a preset threshold quantity of adjustment times. In this case, the base station stops beam adjustment, and sends beam acknowledgement information to all user equipments within beam coverage of the base station, so that after receiving the beam acknowledgement information, the user equipment stops the beam detection and information feedback. In this way, mutual acknowledge between the base station and the user equipment is completed, and subsequent resource allocation and data communication processes may be performed.

According to the foregoing method, at least one user equipment sends detection feedback information to a base station, so that the base station determines, according to the detection feedback information, a beam that needs to be adjusted, and adjusts an antenna bay generating the beam, so as to reduce overlapping coverage of a beam generated by an adjusted antenna bay, reduce inter-beam interference, or make more beams meet a signal transmission threshold, improve a system capacity, and improve user experience.

Figure 12A:
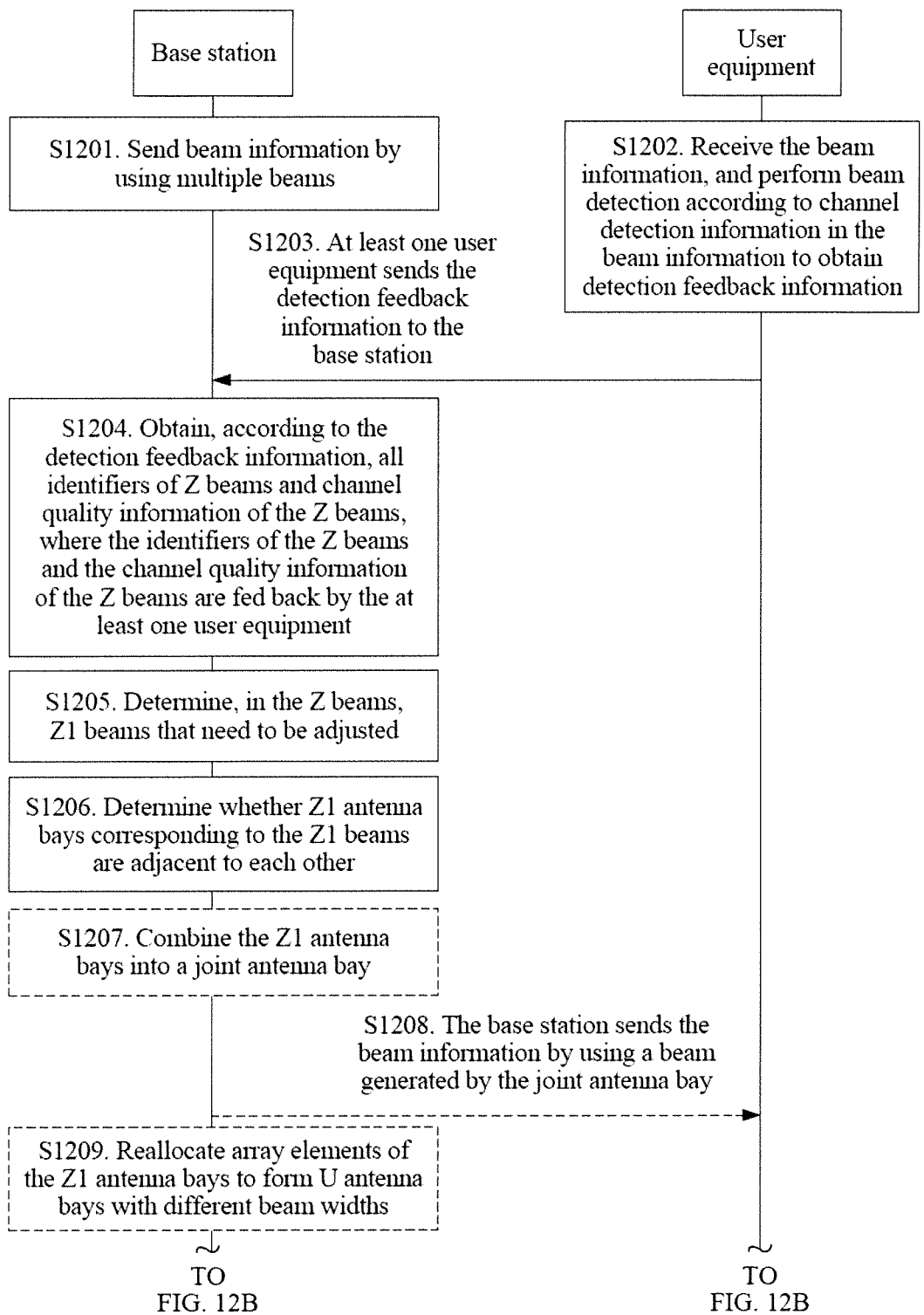
FIG. 12A and FIG. 12B are a schematic flowchart of another beam adjustment method according to an embodiment of the present invention.
Figure 12B:
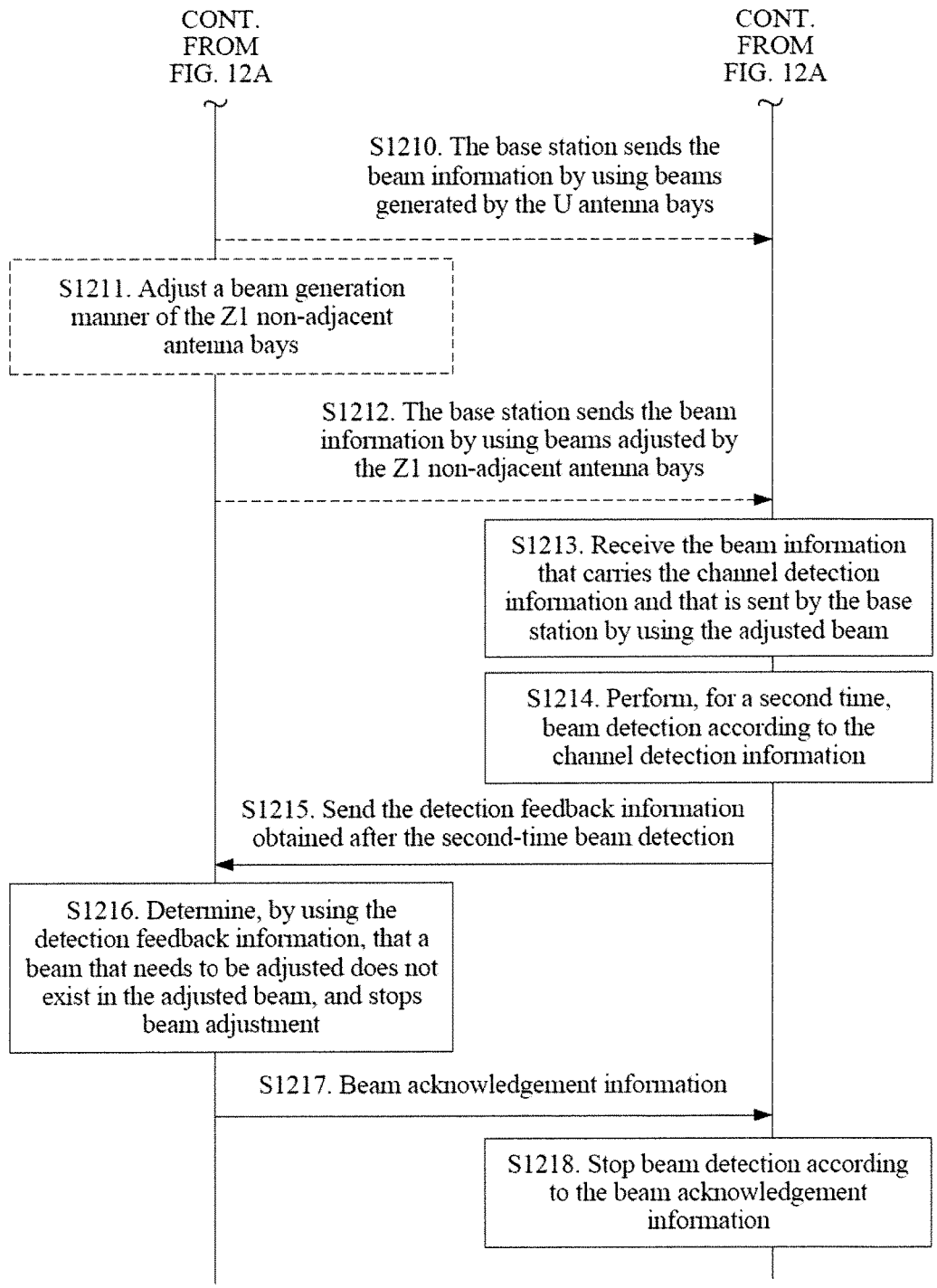

To make a person skilled in the art more clearly understand technical solutions of a beam adjustment method provided in this embodiment of the present invention, by using a specific embodiment, the following describes in detail another beam adjustment method provided in the present invention. In this embodiment, an example of performing adjustment due to overlapping beam coverage is used for description. As shown in FIG. 12A and FIG. 12B, the method includes the following steps:

S1201. A base station sends beam information by using multiple beams.

Figure 1:
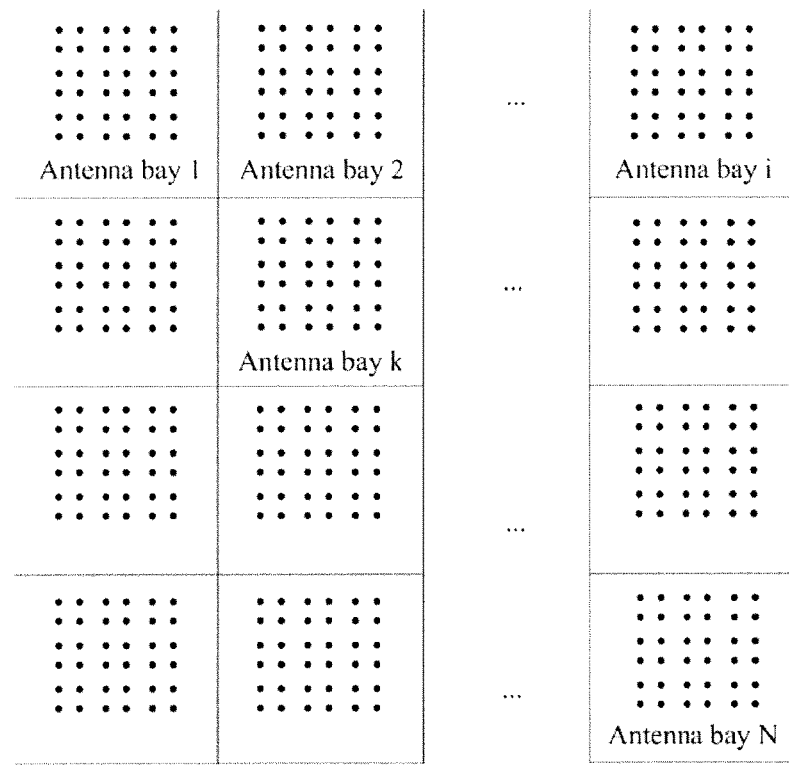
FIG. 1 is a schematic structural diagram of an antenna according to an embodiment of the present invention.
Figure 2:
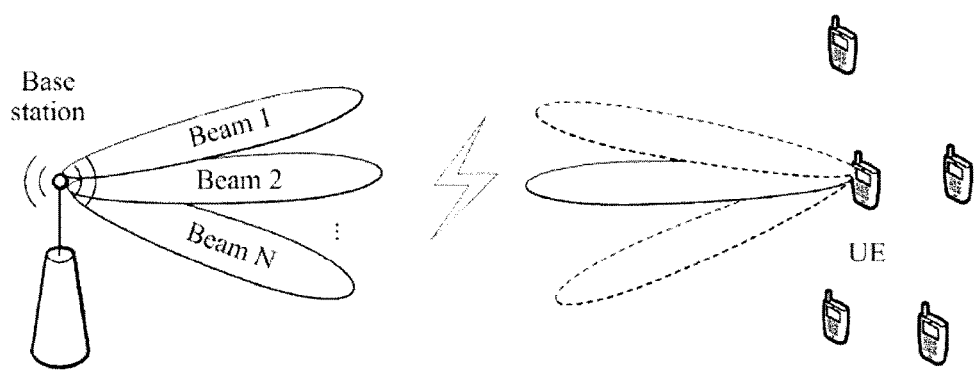
FIG. 2 is a schematic structural diagram of a communications system according to an embodiment of the present invention.

Specifically, as shown in FIG. 2, the base station uses each beam in a beam 1 to a beam N to send the beam information. The beam information includes a beam identifier and channel detection information that correspond to the beam. Preferably, channel detection information of a beam is irrelevant to that of another beam.

S1202. User equipment receives beam information of any beam, and performs beam detection according to channel detection information in the beam information to obtain detection feedback information.

Specifically, the user equipment detects channel quality of a corresponding beam according to the channel detection information, and identifies, by means of detection, a beam identifier of a beam corresponding to a received signal.

For example, as shown in FIG. 2, when receiving the beam information of any beam, any user equipment within coverage of a beam sent by the base station performs beam detection according to the channel detection information in the beam information, detects whether all beams covering the user equipment meet a signal transmission condition, and uses, as information carried in the detection feedback information, an identifier of a beam that meets the signal transmission condition and the channel quality information of each beam.

S1203. At least one user equipment sends the detection feedback information to the base station.

For example, the at least one user equipment is user equipment that can be covered by all beams sent by the base station.

S1204. The base station obtains, according to the detection feedback information, all identifiers of Z beams and channel quality information of the Z beams, and the identifiers of the Z beams and the channel quality information of the Z beams are fed back by the at least one user equipment.

Herein Z is a positive integer greater than or equal to 1.

S1205. The base station determines, in the Z beams, Z1 beams that need to be adjusted.

Herein Z1 is a positive integer that is greater than or equal to 1 and less than or equal to Z.

For example, as shown in FIG. 3, both a beam i and a beam k meet the signal transmission condition of the user equipment. Because the beam i and the beam k both cover UE 4, UE 5, and UE 6, detection feedback information sent to the base station by the UE 4 to the UE 6 all includes an identifier of the beam i and an identifier of the beam k. In this case, the base station performs joint statistical analysis according to beam identifiers and beam channel quality information that are fed back by all the user equipments, and determines that beam adjustment needs to be performed on the beam i and the beam k due to overlapping coverage.

S1206. The base station determines whether Z1 antenna bays corresponding to the Z1 beams are adjacent to each other.

For example, a beam identifier of each beam sent by the base station is preset, and a correspondence between a beam identifier of each beam and an antenna bay generating the beam is stored in the base station. After determining the Z1 beams that need to be adjusted, the base station determines, according to identifiers of the Z1 beams, the antenna bays generating the Z1 beams, and determines whether the Z1 beams are adjacent to each other. If the Z1 beams are adjacent to each other, step S1207 and step S1208 are executed, or step 1209 and step S1210 are executed; or if the Z1 beams are not adjacent to each other, step S1211 and step S1212 are executed.

S1207. The base station combines the Z1 antenna bays into a joint antenna bay.

S1208. The base station sends the beam information by using a beam generated by the joint antenna bay.

The beam information includes channel detection information and a beam identifier of a beam generated by an adjusted antenna bay.

It should be noted that step S1207 and step S1208 are an optional manner in which the base station adjusts beam allocation in this embodiment of the present invention. Reference may be specifically made to descriptions corresponding to FIG. 5 and FIG. 6, and details are not described herein again.

S1209. The base station reallocates array elements of the Z1 antenna bays to form U antenna bays with different beam widths.

Herein U is a positive integer greater than or equal to 2.

S1210. The base station sends the beam information by using beams generated by the U antenna bays.

The beam information includes channel detection information and a beam identifier of a beam generated by an adjusted antenna bay.

It should be noted that step S1209 and step S1210 are an optional manner in which the base station adjusts beam allocation in this embodiment of the present invention. Reference may be specifically made to descriptions corresponding to FIG. 7 and FIG. 8, and details are not described herein again.

S1211. The base station adjusts a beam generation manner of the Z1 non-adjacent antenna bays.

S1212. The base station sends the beam information by using beams obtained after the adjustment of the Z1 non-adjacent antenna bays.

The beam information includes channel detection information and a beam identifier of a beam generated by an adjusted antenna bay.

It should be noted that step S1211 and step S1212 are an optional manner in which the base station adjusts beam allocation in this embodiment of the present invention. Reference may be specifically made to descriptions corresponding to FIG. 9, and details are not described herein again.

S1213. The user equipment receives the beam information that carries the channel detection information and that is sent by the base station by using the adjusted beam.

S1214. The user equipment performs, for a second time, beam detection according to the channel detection information.

S1215. The user equipment sends to the base station, detection feedback information obtained after the second-time beam detection.

For the foregoing step S1213 to step S1215, reference may be specifically made to step 1201 to step 1203. After each time of beam allocation adjustment, the base station sends the beam information by using the adjusted beam, to continue to instruct the user equipment to perform beam detection.

S1216. The base station determines, by using the detection feedback information, that a beam that needs to be adjusted does not exist in the adjusted beam, and stops beam adjustment.

S1217. The base station sends beam acknowledgement information to the user equipment.

S1218. The user equipment stops beam detection according to the beam acknowledgement information.

Specifically, the foregoing steps are only described by means of using one time of cyclic adjustment. In a specific implementation process, the foregoing steps may be described by means of cyclic adjustment may be performed for multiple times, until the base station determines, according to detection information fed back by the user equipment, that the beam that needs to be adjusted does not exist in a current beam. In this case, the base station stops the beam adjustment, and sends the beam acknowledgement information to the user equipment. After receiving the beam acknowledgement information, the user equipment stops the beam detection and information feedback. In this way, mutual acknowledge between the base station and the user equipment is completed, and subsequent resource allocation and data communication processes may be performed.

In a possible implementation manner of this embodiment of the present invention, the base station may preset a threshold quantity of adjustment times, and count a quantity of adjustment times in a beam adjustment process. When the quantity of adjustment times reaches the threshold quantity of adjustment times, if the beam that needs to be adjusted still exists, the base station performs resource allocation according to a result obtained after the last time adjustment.

In addition, the foregoing steps are for beam adjustment performed due to overlapping coverage. According to the present invention, adjustment may further be performed due to channel quality and inter-beam interference existing in the beam allocation. For method steps, reference may be made to step S1201 and step S1208 in the foregoing. For a manner of performing adjustment due to channel quality, reference may be made to relevant descriptions of FIG. 10 in the method embodiment on a base station side, and details are not described herein again. According to the present invention, problems about the beam overlapping coverage, the inter-beam interference, and the channel quality may be all resolved. For example, in the foregoing step S1203, the user equipment detects a beam encountering beam interference and a beam whose SNR is less than a signal transmission threshold $SNR^{thd}$, and uses, as information carried in the detection feedback information, an identifier of a beam that meets a condition and the channel detection information of each beam, and sends the information to the base station. The base station determines at least one area that needs to be adjusted, and a problem of beam allocation in the area. For example, the base station determines a first area that needs to undergo channel quality adjustment, and the first area includes the Z1 beams. The base station determines a second area that needs to be adjusted due to overlapping coverage, and the second area includes Z2 beams. The Z2 beams do not have a same beam as the Z1 beams. The base station separately adjusts the Z1 beams and the Z2 beam with reference to the foregoing step S1201 to step S1208.

In this way, user equipment sends detection feedback information to a base station, so that the base station determines, according to the detection feedback information, a beam that needs to be adjusted, and adjusts an antenna bay generating the beam, so as to reduce overlapping coverage of a beam generated by an adjusted antenna bays, reduce inter-beam interference, or make more beams meet a signal transmission threshold, improve a system capacity, and improve user experience.

Figure 13:
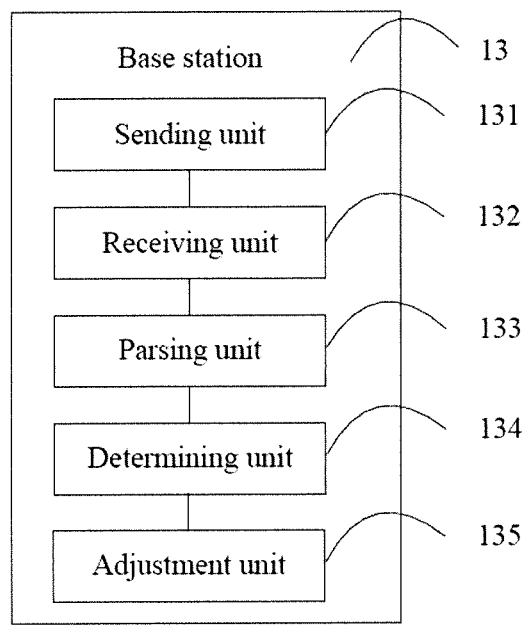
FIG. 13 is a schematic structural diagram of a base station according to an embodiment of the present invention.

An embodiment of the present invention provides a base station 13 corresponding to the foregoing method embodiment in FIG. 4. All functional units of the base station 13 may be configured to perform the foregoing method steps. As shown in FIG. 13, the base station 13 includes:

a sending unit 131, configured to send beam information by using multiple beams; where the beam information includes a beam identifier and channel detection information that correspond to a beam, so that user equipment performs, according to the channel detection information, detection on a beam covering the user equipment, to obtain detection feedback information;

a receiving unit 132, configured to receive the detection feedback information sent by the at least one user equipment;

a parsing unit 133, configured to obtain identifiers of Z beams carried in the detection feedback information, where Z is a positive integer greater than or equal to 1;

a determining unit 134, configured to determine, in the Z beams, Z1 beams that need to be adjusted, where Z1 is a positive integer less than or equal to Z; and an adjustment unit 135, configured to adjust, for at least one time, Z1 antenna bays corresponding to the Z1 beams.

Optionally, the sending unit 131 is specifically configured to send the beam information to the at least one user equipment by using a high frequency band or a low frequency band.

Specifically, after obtaining the channel detection information, any user equipment located within coverage of a beam sent by the base station performs detection on a beam covering the user equipment. For example, M beams cover the user equipment, and M is a positive integer greater than or equal to 1. In this case, the user equipment sends, to the base station by using the detection feedback information, identifiers of m beams that are in the M beams and that meet a condition. The identifiers of the m beams that meet the condition include an identifier of a beam that meets a signal transmission condition of the user equipment, and/or at least two beams whose signal-to-noise ratio SNR difference falls within a preset range, and/or an identifier of a beam whose signal-to-noise ratio SNR is less than a signal transmission threshold $SNR^{thd}$.

Further, the base station obtains a beam identifier from detection feedback information sent by each user equipment. For example, two user equipments send detection feedback information to the base station, detection feedback information sent by first user equipment includes m1 beam identifiers, and detection feedback information sent by second user equipment includes m2 beam identifiers. In this case, if the m1 beam identifiers do not have a same beam identifier as the m2 beam identifiers, the base station may obtain Z=m1+m2 beams from the detection feedback information sent by the first user equipment and the second user equipment; or if the m1 beam identifiers have a same beam identifier as the m2 beam identifiers, the base station may obtain Z<m1+m2 beams from the detection feedback information sent by the first user equipment and the second user equipment.

Further, the following includes three manners in which the base station determines, in the Z beams, the Z1 beams that need to be adjusted:

In a first manner, when the Z beams include a beam that meets a signal transmission condition of the user equipment, and the detection feedback information includes channel quality information of the Z beams, the determining unit 134 is specifically configured to determine, in the Z beams according to the identifiers of the Z beams and the channel quality information of the Z beams, the Z1 beams that need to be adjusted due to overlapping coverage.

Multiple beams that meet the signal transmission condition of the user equipment and that can be received by the user equipment overlap with each other in terms of coverage.

As shown in FIG. 3, both a beam i and a beam k meet the signal transmission condition of the user equipment. Because the beam i and the beam k both cover UE 4, UE 5, and UE 6, detection feedback information sent to the base station by the UE 4 to the UE 6 includes an identifier of the beam i and an identifier of the beam k. In this case, the base station performs joint statistical analysis according to beam identifiers and beam channel quality information that are fed back by all the user equipments, and determines that beam adjustment needs to be performed on the beam i and the beam k due to overlapping coverage.

In a second manner, when the Z beams include at least two beams whose signal-to-noise ratio SNR difference falls within a preset range, and the detection feedback information includes channel quality information of the Z beams, the determining unit 134 is specifically configured to determine, in the Z beams according to the identifiers of the Z beams and the channel quality information of the Z beams, the Z1 beams that need to be adjusted due to inter-beam interference. Inter-beam interference exists between the at least two beams whose signal-to-noise ratio SNR difference falls within the preset range and that can be received by the user equipment.

In an optional implementation manner of this embodiment of the present invention, when all the multiple beams encountering the liner-beam interference are beams that do not meet the signal transmission condition of the user equipment, the base station may not adjust the multiple beams because all the multiple beams cannot serve the user equipment. The present invention sets no limitation thereto.

In another optional implementation manner of the present invention, the multiple beams encountering the inter-beam interference include a beam that does not meet the signal transmission condition of the user equipment, and also include a beam that meets the signal transmission condition of the user equipment, or the multiple beams encountering the inter-beam interference are beams that meet the signal transmission condition of the user equipment.

As shown in FIG. 3, the beam i meets the signal transmission condition of the user equipment, and the beam k does not meet the signal transmission condition of the user equipment but interferes with the beam i. For example, an SNR of the beam i is greater than the $SNR^{thd}$, an SNR of the beam k is less than the $SNR^{thd}$, and an SNR difference between the beam i and the beam k falls within a specific interference range. In this case, detection feedback information sent to the base station by the UE 4 to the UE 6 all includes an identifier of the beam i and an identifier of the beam k. In this case, the base station performs joint statistical analysis according to beam identifiers and beam channel quality information that are fed back by all the user equipments, and determines that beam adjustment needs to be performed on the beam i and the beam k due to inter-beam interference.

In a third manner, when the Z beams includes a beam whose signal-to-noise ratio SNR is less than a signal transmission threshold $SNR^{thd}$, and the detection feedback information includes channel quality information of the Z beams, the determining unit 134 is specifically configured to determine, in the Z beams according to the identifiers of the Z beams and the channel quality information of the Z beams, the Z1 beams that require channel quality adjustment.

Specifically, when any user equipment detects that an SNR of a first beam covering the equipment is less than the signal transmission threshold $SNR^{thd}$, the user equipment feeds back an identifier of the first beam to the base station. The base station determines an adjacent antenna bay of a first antenna bay corresponding to the first beam. If a signal-to-noise ratio SNR of a beam corresponding to the adjacent antenna bay is greater than the signal transmission threshold $SNR^{thd}$, the base station determines that the first beam and the beam corresponding to the adjacent antenna bay are the Z1 beams that require channel quality adjustment.

In this way, when a beam that meets the signal transmission condition of the user equipment does not exist, the user equipment may feed back an identifier of a beam with a maximum SNR in beams covering the user equipment to the base station. In this case, the beam with the maximum SNR is the foregoing first beam.

It should be noted that the foregoing three manners are three manners in which the base station determines, according to different feedback manners of the user equipment, the Z1 beams that need to be adjusted. In specific implementation, the user equipment may carry, in the detection feedback information, at least one of an identifier of a beam encountering overlapping coverage, an identifier of a beam encountering inter-beam interference, or an identifier of a beam whose SNR is less than the signal transmission threshold $SNR^{thd}$. In this way, the base station performs analysis in at least one of the foregoing three manners according to feedback of the at least one user equipment to determine a problem in beam allocation. When analyzing the problem in beam allocation, the base station may use a total capacity of a local area as a principle, and/or use user experience as a principle.

In addition, the base station may further simultaneously determine, in the Z beams, other Z2 beams that need to be adjusted. The Z2 beams do not have a same beam as the Z1 beams, and a problem in beam allocation of the Z2 beams may be different from a problem in beam allocation of the Z1 beams. For example, the Z1 beams are a beam 1, a beam 2, and a beam 3 that are adjacent to each other, and an SNR corresponding to the beam 1 is less than the $SNR^{thd}$; and therefore, channel quality adjustment needs to be performed. The Z2 beams are a beam 4 and a beam 5. The beam 4 and the beam 5 cover same user equipment, and need to be adjusted due to overlapping coverage.

Further, after determining the Z1 beams that need to be adjusted, the base station determines Z1 antenna bays generating the Z1 beams. For example, a beam identifier of each beam sent by the base station is preset, and a correspondence between a beam identifier of each beam and an antenna bay generating the beam is stored in the base station. After determining the Z1 beams that need to be adjusted, the base station determines, according to identifiers of the Z1 beams, antenna bays generating the Z1 beams.

Further, for the foregoing first manner and second manner, the adjustment unit 135 is specifically configured to: when the Z1 antenna bays generating the Z1 beams are adjacent to each other, combine array elements of the Z1 antenna bays into a joint antenna bay, and a joint beam generated by using the joint antenna bay covers the user equipment.

For example, the detection feedback information sent to the base station by the at least one user equipment includes a beam i and a beam k, and the base station determines that overlapping coverage or inter-beam interference exists between the beam i and the beam k. The base station determines, according to an identifier of the beam i and an identifier of the beam k, an antenna bay i generating the beam i and an antenna bay k generating the beam k. As shown in FIG. 5, the antenna bay i is adjacent to the antenna bay k. The base station combines an array element of the antenna bay i and an array element of the antenna bay k into a new joint bay, and a beam generated by the joint bay covers the user equipment. In this case, as shown in FIG. 6, user equipment UE 4, UE 5, and UE 6 that are originally covered by a beam i and a beam k are covered by a joint beam. In this way, overlapping coverage and inter-beam interference are avoided, and user experience of the UE 4, the UE 5, and the UE 6 are ensured.

The foregoing is only an example for illustration. In practical application, user equipment may be covered by at least two beams. In this case, beam identifiers fed back to the base station by the user equipment include at least two beam identifiers, and the base station may combine at least two adjacent antenna bays into one antenna bay. The present invention sets no limitation thereto.

Optionally, for the beam allocation determined in the foregoing first manner and second manner, the adjustment unit 135 is specifically configured to: when the Z1 antenna bays are adjacent to each other, reallocate array elements of the Z1 antenna bays to form U antenna bays with different beam widths, where U is a positive integer greater than or equal to 2.

For example, the detection feedback information sent to the base station by the at least one user equipment includes a beam i and a beam k, and the base station determines that overlapping coverage or inter-beam interference exists between the beam i and the beam k. The base station determines, according to an identifier of the beam i and an identifier of the beam k, an antenna bay i generating the beam i and an antenna bay k generating the beam k. As shown in FIG. 7, the antenna bay i is adjacent to the antenna bay k. The base station reallocates an array element of the antenna bay i and an array element of the antenna bay k, allocates fewer array elements to the antenna bay i to form a new antenna bay a, and allocates more array elements to the antenna bay k to form a new antenna bay b. A beam a generated by the antenna bay a and a beam b generated by the antenna bay b cover user equipment. As shown in FIG. 8, the beam i originally covers user equipment UE 1 to UE 6, and the beam k originally covers user equipment UE 4 to UE 8, while in this case, the beam a covers the user equipment UE 1 to UE 6, and the beam b covers the user equipment UE 7 and UE 8. In this way, the user equipment UE 4, UE 5, and UE 6 that are originally covered by the beam i and the beam k are covered by the beam a, so that overlapping coverage and inter-beam interference are avoided, and user experience of the UE 4, the UE 5, and the UE 6 are ensured.

The foregoing is only an example for illustration. The base station adjusts two beams with same beam width to a wide beam and a narrow beam. A quantity of newly generated beams obtained after the adjustment is not limited in this embodiment of the present invention. For example, the base station may regroup, into three antenna bays, antenna bays corresponding to the two beams.

Optionally, for the beam allocation determined in the foregoing first manner and second manner, the adjustment unit 135 is specifically configured to: when the Z1 antenna bays are not adjacent to each other, adjust a beamforming algoritlun of the Z1 non-adjacent antenna bays to change beam widths and/or beam directions of beams generated by the Z1 antenna bays.

For example, the detection feedback information sent to the base station by the at least one user equipment includes a beam i and a beam k, and the base station determines that overlapping coverage or inter-beam interference exists between the beam i and the beam k. The base station determines, according to an identifier of the beam i and an identifier of the beam k, an antenna bay i generating the beam i and an antenna bay k generating the beam k. As shown in FIG. 9, the antenna bay i is not adjacent to the antenna bay k. In this case, the base station may separately adjust beam directions and/or beam widths of the beam i and the beam k by using a beamforming algorithm. As shown in FIG. 8, the beam a is a beam generated after the beamforming algorithm of the antenna bay i is adjusted, and the beam b is a beam generated after the beamforming algorithm of the antenna bay k is adjusted.

Optionally, for the beam allocation determined in the foregoing third manner, the determining unit 134 is specifically configured to: determine, in the Z beams, a first beam whose signal-to-noise ratio SNR is less than the signal transmission threshold $SNR^{thd}$, determine an adjacent antenna bay of a first antenna bay corresponding to the first beam, and if a signal-to-noise ratio SNR of a beam corresponding to the adjacent antenna bay is greater than the signal transmission threshold $SNR^{thd}$, determine the first beam and the beam corresponding to the adjacent antenna bay are the Z1 beams that require channel quality adjustment. The adjustment unit 135 is specifically configured to reallocate array elements of the Z1 antenna bays, and increase a quantity of array elements of the first antenna bay, so that the signal-to-noise ratio SNR of the first beam is greater than the signal transmission threshold $SNR^{thd}$, and an SNR of a beam corresponding to the adjacent antenna bay of the first adjusted antenna bay is still greater than the $SNR^{thd}$.

It should be noted that: beams generated by different antenna bays are corresponding to different channel quality, due to different channel fading and path losses. For an antenna bay corresponding to a channel with relatively good channel quality, a signal-to-noise ratio received by user equipment within coverage of a beam generated by the antenna bay meets a signal transmission requirement. For example, the SNR received by the user equipment is greater than the signal transmission threshold $SNR_{thd}$. However, for an antenna bay corresponding to a channel with relatively poor channel quality, a signal-to-noise ratio received by user equipment within coverage of a beam generated by the antenna bay does not meet the signal transmission requirement. For example, the signal-to-noise ratio SNR received by the user equipment is less than the signal transmission threshold $SNR_{thd}$. In this case, the antenna bay cannot serve the user equipment covered by the antenna bay, and resources are wasted.

However, in this embodiment of the present invention, when detecting a beam identifier of a beam covering user equipment, the user equipment may simultaneously detect, according to channel detection information, channel quality corresponding to each beam, and send, to a base station, detection feedback information carrying a beam identifier of each beam and channel quality information that corresponds to each beam. In this way, the base station may learn of, according to the beam identifier, an antenna bay corresponding to the beam coveting the user equipment, and may learn of, according to the channel quality information, channel quality corresponding to the antenna bay. In this way, for user equipment whose beam does not meet a signal transmission condition of the user equipment, the base station may enhance channel quality of a beam with a maximum SNR in the beams covering the user equipment, so that the beam with the maximum SNR meets the signal transmission condition and serves the user equipment. Therefore, a waste of resources is avoided.

FIG. 10 is used as an example for illustration. If an antenna bay i, an antenna bay j, and an antenna bay k that cover the user equipment are adjacent to one another, and the base station determines, according to the channel quality information, that an SNR corresponding to the antenna bay i is A1, an SNR corresponding to the antenna bay j is A2, an SNR corresponding to the antenna bay k is A3, and $A1 \geq A2 \geq SNR_{thd} > A3$, because a signal-to-noise ratio SNR corresponding to the antenna bay k is less than the signal transmission threshold $SNR_{thd}$, the antenna bay k cannot serve the user equipment covered by the antenna bay k. In this case, the base station reallocates array elements of the antenna bay i, the antenna bay j, and the antenna bay k, and allocates more array elements to the antenna bay k, and allocates fewer array elements to the antenna bay i and the antenna bay j, so as to form three new antenna bays i', j', and k'. Beams generated by the antenna bay i', the antenna bay j', and the antenna bay k' cover the user equipment.

It should be noted that after performing adjustment for one time, the base station may continue to instruct the user equipment to perform beam detection, and may receive channel quality corresponding to the three new antenna bays i', j', and k' sent by the user equipment, that is, A1', A2', and A3' shown in FIG. 10. The base station determines whether A1', A2', and A3' are all greater than or equal to the signal transmission threshold $SNR_{thd}$. If A1', A2', and A3' are all greater than or equal to the signal transmission threshold $SNR_{thd}$, adjustment is stopped; or if A1', A2', and A3' are all less than the signal transmission threshold $SNR_{thd}$, the base station continues to reallocate array elements of the antenna bays i', j', and k', until all SNRs corresponding to newly generated antenna bays are greater than or equal to the signal transmission threshold $SNR_{thd}$.

In addition, in a possible implementation manner of this embodiment of the present invention, the base station may preset a threshold quantity of adjustment times, and count a quantity of adjustment times in a beam adjustment process. When the quantity of adjustment times reaches the threshold quantity of adjustment times, if an SNR of an adjusted beam is still less than the signal transmission threshold $SNR_{thd}$, the base station performs resource allocation according to a result obtained after the last time adjustment.

Optionally, the determining unit 134 is further configured to determine that a beam that needs to be adjusted does not exist in the Z beams, and instruct the adjustment unit to stop adjusting an antenna bay. The sending unit 131 is further configured to send beam acknowledgement information to the at least one user equipment, so that the at least one user equipment stops beam detection according to the beam acknowledgement information.

Specifically, after each time of beam allocation adjustment, the base station sends the beam information by using the adjusted beam, to continue to instruct the user equipment to perform beam detection, and performs adjustment for multiple times until the base station determines, according to detection information fed back by the user equipment, that a beam that needs to be adjusted does not exist in the Z beams, or a quantity of adjustment times of the base station reaches a preset threshold quantity of adjustment times. In this case, the base station stops beam adjustment, and sends beam acknowledgement information to all user equipments within beam coverage of the base station, so that after receiving the beam acknowledgement information, the user equipment stops the beam detection and information feedback. In this way, mutual acknowledge between the base station and the user equipment is completed, and subsequent resource allocation and data communication processes may be performed.

It may be clearly understood by a person skilled in the art that, for convenient and brief description, division of the foregoing functional modules is used as an example for illustration. In practical application, the foregoing functions can be allocated to different functional modules and implemented according to a requirement, that is, an internal structure of an apparatus is divided into different functional modules to implement all or some of the functions described above. For a detailed working process of the foregoing system, apparatus, and unit, reference may be made to a corresponding process in the foregoing method embodiments, and details are not described herein again.

According to the foregoing base station, the base station determines, by using detection feedback information sent by at least one user equipment, a beam that needs to be adjusted, and adjusts an antenna bay generating the beam, so as to reduce overlapping coverage of a beam generated by an adjusted antenna bay, reduce inter-beam interference, or make more beams meet a signal transmission threshold, improve a system capacity, and improve user experience.

Figure 14:
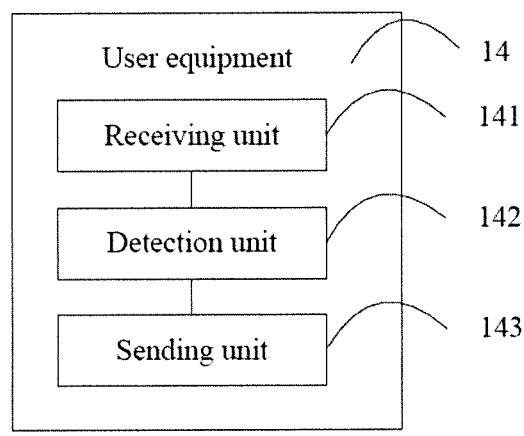
FIG. 14 is a schematic structural diagram of user equipment according to an embodiment of the present invention.

An embodiment of the present invention provides user equipment 14 corresponding to the foregoing method embodiment in FIG. 11. All functional units of the user equipment 14 may be configured to perform the foregoing method steps. As shown in FIG. 14, the user equipment 14 includes:

a receiving unit 141, configured to receive beam information that is sent by a base station by using a beam, where the beam information includes a beam identifier and channel detection information that correspond to the beam;

a detection unit 142, configured to perform, according to the channel detection information, detection on M beams covering the user equipment, to obtain detection feedback information, where the detection feedback information includes identifiers of m beams, and m is a positive integer that is greater than or equal to 1 and less than or equal to M; and a sending unit 143, configured to send the detection feedback information to the base station, so that after receiving detection feedback information sent by at least one user equipment, the base station obtains all identifiers of Z beams carried in the detection feedback information, determines, in the Z beams, Z1 beams that need to be adjusted, and adjusts, for at least one time, Z1 antenna bays corresponding to the Z1 beams, where Z is a positive integer greater than or equal to m, and Z1 is a positive integer less than or equal to Z.

Optionally, the detection feedback information further includes channel quality information of the m beams, and the detection unit 142 is specifically configured to detect, in the M beams, a beam that meets a signal transmission condition of the user equipment, where the identifiers of the m beams include an identifier of the beam that meets the signal transmission condition of the user equipment.

For example, the user equipment detects channel quality of a first beam covering the user equipment. If the channel quality of the first beam meets the signal transmission condition. A beam identifier of the first beam is obtained from beam information corresponding to the first beam, and the first beam is any beam covering the user equipment. When the user equipment completes detection of all beams covering the user equipment, the user equipment sends, to the base station by using the detection feedback information, a beam identifier of the beam that meets the signal transmission condition of the user equipment and channel quality information of each beam.

Optionally, the detection feedback information further includes channel quality information of the m beams, and the detection unit 142 is specifically configured to detect, in the M beams, at least two beams whose signal-to-noise ratio SNR difference falls within a preset range. The identifiers of the m beams include identifiers of the at least two beams whose signal-to-noise ratio SNR difference falls within the preset range.

For example, there are two beams covering the user equipment. The user equipment may determine whether an SNR difference between a beam 1 and a beam 2 falls within a preset difference range, to determine whether inter-beam interference exists between the beam 1 and the beam 2. If an SNR of the beam 1 approximates to that of the beam 2, the inter-beam interference exists between the beam 1 and the beam 2.

Optionally, the detection feedback information further includes channel quality information of the m beams, and the detection unit 142 is specifically configured to detect, in the M beams, a beam whose signal-to-noise ratio SNR is less than a signal transmission threshold $SNR^{thd}$. The identifiers of the m beams include an identifier of the beam whose signal-to-noise ratio SNR is less than the signal transmission threshold $SNR^{thd}$.

It should be noted that for the foregoing three optional feedback manners. The user equipment may perform one of the three feedback manners. For example, the user equipment only feeds back an identifier of a beam with overlapping coverage. In this case, the base station determines, in the first manner described in step S403 in the previous method embodiment of the present invention, the Z1 beams that need to be adjusted. In addition, the user equipment may also perform multiple manners in the foregoing three optional feedback manners, and the base station determines, in the first manner to the third manner described in step S403 in the previous method embodiment of the present invention, the Z1 beams that need to be adjusted. The present invention sets no limitation thereto. For example, the user equipment feeds back an identifier of a beam with overlapping coverage and an identifier of a beam encountering inter-beam interference. In this case, for user equipment covered by three beams, if the user equipment determines, by means of detection, that a beam 1 and a beam 2 meet a signal transmission condition, and a beam 3 does not meet the signal transmission condition, the user equipment does not need to determine whether the beam 1 interferes with the beam 2, and needs to only determine whether the beam 3 interferes with the beam 1 and the beam 2. If the beam 3 interferes with the beam 1 and the beam 2, the user equipment feeds back an identifier of the beam 1, an identifier of the beam 2, and an identifier of the beam 3.

Further, the base station adjusts beam allocation according to the detection feedback information sent by the at least one user equipment. For a specific process, reference may be made to descriptions corresponding to FIG. 5 to FIG. 10 in the method embodiment on a base station side, and details are not described herein again.

It should be noted that the base station may receive detection feedback information sent by multiple user equipments. The user equipments may be covered by different quantities of beams, and the user equipments may feed back different quantities of beam identifiers. That is, different user equipments may be corresponding to different M values and m values.

Optionally. The receiving unit 141 is further configured to receive beam acknowledgement information sent by the base station, and instruct the detection unit according to the beam acknowledgement information to stop beam detection.

Specifically, after each time of beam allocation adjustment, the base station sends the beam information by using the adjusted beam, to continue to instruct the user equipment to perform beam detection, and performs adjustment for multiple times until the base station determines, according to detection information fed back by the user equipment, that a beam that needs to be adjusted does not exist in the Z beams, or a quantity of adjustment times of the base station reaches a preset threshold quantity of adjustment times. In this case, the base station stops beam adjustment, and sends beam acknowledgement information to all user equipments within beam coverage of the base station, so that after receiving the beam acknowledgement information, the user equipment stops the beam detection and information feedback. In this way, mutual acknowledge between the base station and the user equipment is completed, and subsequent resource allocation and data communication processes may be preformed.

It may be clearly understood by a person skilled in the art that, for convenient and brief description, division of the foregoing functional modules is used as an example for illustration. In practical application, the foregoing functions can be allocated to different functional modules and implemented according to a requirement, that is, an internal structure of an apparatus is divided into different functional modules to implement all or some of the functions described above. For a detailed working process of the foregoing system, apparatus, and unit, reference may be made to a corresponding process in the foregoing method embodiments, and details are not described herein again.

According to the foregoing user equipment, at least one user equipment sends detection feedback information to a base station, so that the base station determines, according to the detection feedback information, a beam that needs to be adjusted, and adjusts an antenna bay generating the beam, so as to reduce overlapping coverage of a beam generated by an adjusted antenna bay, reduce inter-beam interference, or make more beams meet a signal transmission threshold, improve a system capacity, and improve user experience.

Figure 15:
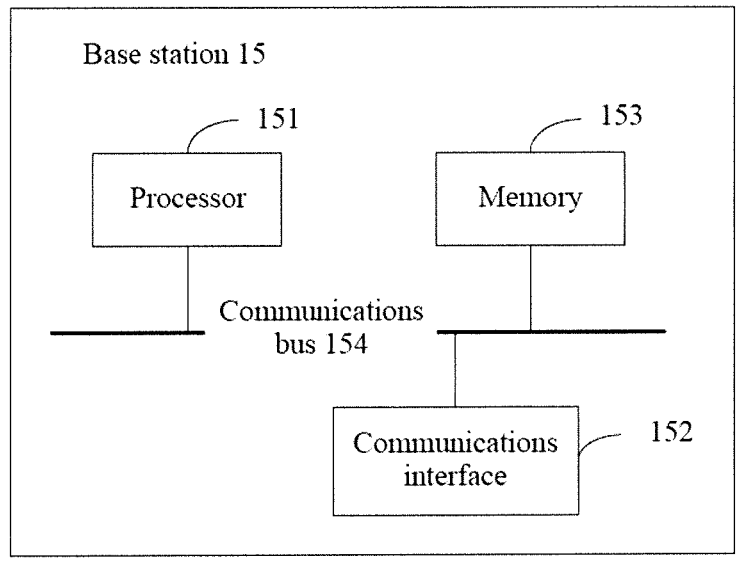
FIG. 15 is a schematic structural diagram of another base station according to an embodiment of the present invention.

An embodiment of the present invention provides a base station 15. As shown in FIG. 15, the base station 15 includes:

a processor 151, a communications interface 152, a memory 153, and a communications bus 154, where the processor 151, the communications interface 152, and the memory 153 communicate with each other by using the communications bus 154.

The processor 151 may be a multi-core central processing unit CPU, or an application-specific integrated circuit ASIC (Application-Specific Integrated Circuit), or one or more integrated circuits configured to implement this embodiment of the present invention.

The memory 153 is configured to store program code. The program code includes a computer operation instruction and a network flow diagram. The memory 153 may include a high-speed RAM memory, and may further include a non-volatile memory, such as, at least one magnetic disk memory.

The communications interface 152 is configured to implement a connection and communication between these apparatuses.

The processor 151 is configured to execute the program code in the memory 153, to implement the following operations:

sending beam information by using multiple beams, where the beam information includes a beam identifier and channel detection information that correspond to a beam, so that user equipment performs, according to the channel detection information. Detection on a beam covering the user equipment, to obtain detection feedback information;

receiving the detection feedback information sent by the at least one user equipment;

obtaining identifiers of Z beams carried in the detection feedback information, where Z is a positive integer greater than or equal to 1, and determining, in the Z beams, Z1 beams that need to be adjusted, where Z1 is a positive integer less than or equal to Z; and adjusting, for at least one time, Z1 antenna bays corresponding to the Z1 beams.

Optionally, the Z beams include a beam that meets a signal transmission condition of the user equipment, and the detection feedback information includes channel quality information of the Z beams.

The determining, in the Z beams, Z1 beams that need to be adjusted includes:

determining, in the Z beams according to the identifiers of the Z beams and the channel quality information of the Z beams, the Z1 beams that need to be adjusted due to overlapping coverage, where multiple beams that meet the signal transmission condition of the user equipment and that can be received by the user equipment overlap with each other in terms of coverage.

Optionally, the Z beams include at least two beams whose signal-to-noise ratio SNR difference falls within a preset range, and the detection feedback information includes channel quality information of the Z beams.

The determining, in the Z beams, Z1 beams that need to be adjusted includes:

determining, in the Z beams according to the identifiers of the Z beams and the channel quality information of the Z beams, the Z1 beams that need to be adjusted due to inter-beam interference, where inter-beam interference exists between the at least two beams whose signal-to-noise ratio SNR difference falls within the preset range and that can be received by the user equipment.

Optionally, the adjusting, for at least one time, Z1 antenna bays corresponding to the Z1 beams includes:

if the Z1 antenna bays are adjacent to each other, combining array elements of the Z1 antenna bays into a joint antenna bay, and generating a joint beam by using the joint antenna bay.

Optionally, the adjusting, for at least one time, Z1 antenna bays corresponding to the Z1 beams includes:

if the Z1 antenna bays are adjacent to each other, reallocating array elements of the Z1 antenna bays to form U antenna bays with different beam widths, where U is a positive integer greater than or equal to 2.

Optionally, the adjusting, for at least one time, Z1 antenna bays corresponding to the Z1 beams includes:

if the Z1 antenna bays are not adjacent to each other, adjusting a beamforming algoritlun of the Z1 non-adjacent antenna bays to change beam widths and/or beam directions of beams generated by the Z1 antenna bays.

Optionally, the Z beams include a beam whose signal-to-noise ratio SNR is less than a signal transmission threshold $SNR^{thd}$, and the detection feedback information includes channel quality information of the Z beams.

The determining, in the Z beams, Z1 beams that need to be adjusted includes:

determining, in the Z beams according to the identifiers of the Z beams and the channel quality information of the Z beams, the Z1 beams that require channel quality adjustment.

Optionally, the determining, in the Z beams, Z1 beams that need to be adjusted includes:

determining, in the Z beams, a first beam whose signal-to-noise ratio SNR is less than the signal transmission threshold $SNR^{thd}$, determining an adjacent antenna bay of a first antenna bay corresponding to the first beam, and if a signal-to-noise ratio SNR of a beam corresponding to the adjacent antenna bay is greater than the signal transmission threshold $SNR^{thd}$, determining that the first beam and the beam corresponding to the adjacent antenna bay are the Z1 beams that require channel quality adjustment.

The adjusting, for at least one time, Z1 antenna bays corresponding to the Z1 beams includes:

reallocating array elements of the Z1 antenna bays, and increasing a quantity of array elements of the first antenna bay, so that the signal-to-noise ratio SNR of the first beam is greater than the signal transmission threshold $SNR^{thd}$.

Optionally, the operation further includes:

determining that a beam that needs to be adjusted does not exist in the Z beams, and stopping adjusting an antenna bay; and sending beam acknowledgement information to the at least one user equipment, so that the at least one user equipment stops beam detection according to the beam acknowledgement information.

Optionally, the sending, by a base station, beam information by using multiple beams includes:

sending, by the base station, the beam information to the at least one user equipment by using a high frequency baud or a low frequency band.

It may be clearly understood by a person skilled in the art that, for convenient and brief description, division of the foregoing functional modules is used as an example for illustration. In practical application, the foregoing functions can be allocated to different functional modules and implemented according to a requirement, that is, an internal structure of an apparatus is divided into different functional modules to implement all or some of the functions described above. For a detailed working process of the foregoing system, apparatus, and unit, reference may be made to a corresponding process in the foregoing method embodiments, and details are not described herein again.

Figure 16:
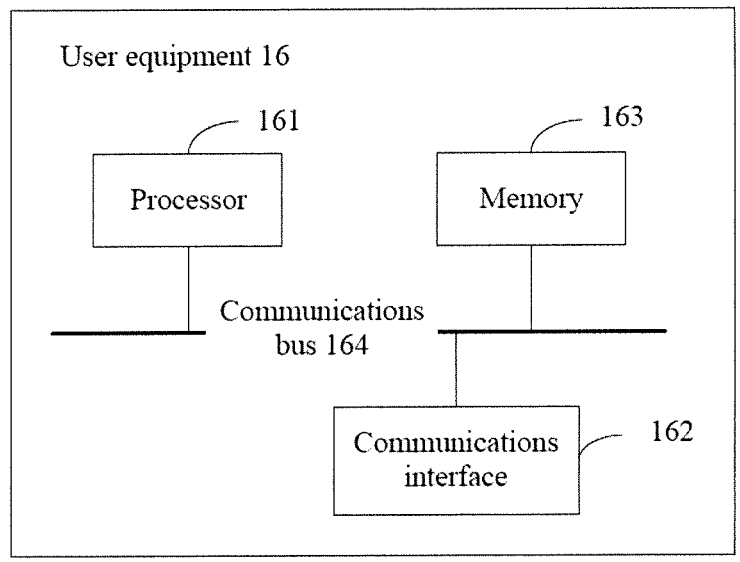
FIG. 16 is a schematic structural diagram of another user equipment according to an embodiment of the present invention.

An embodiment of the present invention provides user equipment 16. As shown in FIG. 16, the user equipment 16 includes:

a processor 161, a communications interface 162, a memory 163, and a communications bus 164, where the processor 161, the communications interface 162, and the memory 163 communicate with each other by using the communications bus 164.

The processor 161 may be a multi-core central processing unit CPU, or an application-specific integrated circuit ASIC (Application-Specific Integrated Circuit), or one or more integrated circuits configured to implement this embodiment of the present invention.

The memory 163 is configured to store program code. The program code includes a computer operation instruction and a network flow diagram. The memory 163 may include a high-speed RAM memory, and may further include a non-volatile memory, such as, at least one magnetic disk memory.

The communications interface 162 is configured to implement a connection and communication between these apparatuses.

The processor 161 is configured to execute the program code in the memory 163, to implement the following operations:

receiving beam information that is sent by a base station by using a beam, where the beam information includes a beam identifier and channel detection information that correspond to the beam;

performing, according to the channel detection information, detection on M beams covering the user equipment, to obtain detection feedback information, where the detection feedback information includes identifiers of m beams, and m is a positive integer that is greater than or equal to 1 and less than or equal to M; and sending the detection feedback information to the base station, so that after receiving detection feedback information sent by the at least one user equipment, the base station obtains all identifiers of Z beams carried in the detection feedback information, determines, in the Z beams, Z1 beams that need to be adjusted, and adjusts, for at least one time, Z1 antenna bays corresponding to the Z1 beams, where Z is a positive integer greater than or equal to m, and Z1 is a positive integer less than or equal to Z.

Optionally, the detection feedback information further includes channel quality information of the m beams, and the performing, according to the channel detection information, detection on M beams covering the user equipment includes:

detecting, in the M beams, a beam that meets a signal transmission condition of the user equipment, where the identifiers of the m beams include an identifier of the beam that meets the signal transmission condition of the user equipment.

Optionally, the detection feedback information further includes channel quality information of the m beams, and the performing, according to the channel detection information, detection on M beams covering the user equipment includes:

detecting, in the M beams, at least two beams whose signal-to-noise ratio SNR difference falls within a preset range, where the identifiers of the m beams include identifiers of the at least two beams whose signal-to-noise ratio SNR difference falls within the preset range.

Optionally, the detection feedback information further includes channel quality information of the m beams, and the performing, according to the channel detection information, detection on M beams covering the user equipment includes:

detecting, in the M beams, a beam whose signal-to-noise ratio SNR is less than a signal transmission threshold $SNR^{thd}$, where the identifiers of the m beams include an identifier of the beam whose signal-to-noise ratio SNR is less than the signal transmission threshold $SNR^{thd}$.

Optionally, the operation further includes:

receiving beam acknowledgement information sent by the base station, and stopping beam detection according to the beam acknowledgement information.

It may be clearly understood by a person skilled in the art that, for convenient and brief description, division of the foregoing functional modules is used as an example for illustration. In practical application, the foregoing functions can be allocated to different functional modules and implemented according to a requirement, that is, an internal structure of an apparatus is divided into different functional modules to implement all or some of the functions described above. For a detailed working process of the foregoing system, apparatus, and unit, reference may be made to a corresponding process in the foregoing method embodiments, and details are not described herein again.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A beam adjustment method, comprising:
    sending, by a base station, beam information by using multiple beams, wherein the beam information comprises a beam identifier and channel detection information that correspond to a beam, so that user equipment performs, according to the channel detection information, detection on a beam covering the user equipment, to obtain detection feedback information;
    receiving the detection feedback information sent by at least one user equipment;
    obtaining identifiers of Z beams carried in the detection feedback information, wherein Z is a positive integer greater than or equal to 1, and determining, in the Z beams, Z1 beams that need to be adjusted, wherein Z1 is a positive integer less than or equal to Z: and
    adjusting, for at least one time, Z1 antenna bays corresponding to the Z1 beams.

2. The method according to claim 1, wherein the Z beams comprise a beam that meets a signal transmission condition of the user equipment, and the detection feedback information comprises channel quality information of the Z beams; and
    the determining, in the Z beams, Z1 beams that need to be adjusted comprises:
    determining, in the Z beams according to the identifiers of the Z beams and the channel quality information of the Z beams, the Z1 beams that need to be adjusted due to overlapping coverage, wherein multiple beams that meet the signal transmission condition of the user equipment and that can be received by the user equipment overlap with each other in terms of coverage.

3. The method according to claim 1, wherein the Z beams comprise at least two beams whose signal-to-noise ratio (SNR) difference falls within a preset range, and the detection feedback information comprises channel quality information of the Z beams; and
    the determining, in the Z beams, Z1 beams that need to be adjusted comprises:
    determining, in the Z beams according to the identifiers of the Z beams and the channel quality information of the Z beams, the Z1 beams that need to be adjusted due to inter-beam interference, wherein inter-beam interference exists between the at least two beams whose signal-to-noise ratio SNR difference falls within the preset range and that can be received by the user equipment.

4. The method according to claim 2, wherein the adjusting, for at least one time, Z1 antenna bays corresponding to the Z1 beams comprises:
    if the Z1 antenna bays are adjacent to each other, combining array elements of the Z1 antenna bays into a joint antenna bay, and generating a joint beam by using the joint antenna bay.

5. The method according to claim 2, wherein the adjusting, for at least one time, Z1 antenna bays corresponding to the Z1 beams comprises:
    if the Z1 antenna bays are adjacent to each other, reallocating array elements of the Z1 antenna bays to form U antenna bays with different beam widths, wherein U is a positive integer greater than or equal to 2.

6. The method according to claim 2, wherein the adjusting, for at least one time, Z1 antenna bays corresponding to the Z1 beams comprises:
    if the Z1 antenna bays are not adjacent to each other, adjusting a beamforming algorithm of the Z1 non-adjacent antenna bays to change beam widths and/or beam directions of beams generated by the Z1 antenna bays.

7. The method according to claim 1, wherein the Z beams comprise a beam whose signal-to-noise ratio SNR is less than a signal transmission threshold $SNR^{thd}$, and the detection feedback information comprises channel quality information of the Z beams; and
    the determining, in the Z beams, Z1 beams that need to be adjusted comprises:
    determining, in the Z beams according to the identifiers of the Z beams and the channel quality information of the Z beams, the Z1 beams that require channel quality adjustment.

8. A beam adjustment method, comprising:
    receiving, by user equipment, beam information that is sent by a base station by using a beam, wherein the beam information comprises a beam identifier and channel detection information that correspond to the beam;

performing, according to the channel detection information, detection on M beams covering the user equipment, to obtain detection feedback information, wherein the detection feedback information comprises identifiers of m beams, and m is a positive integer that is greater than or equal to 1 and less than or equal to M; and sending the detection feedback information to the base station, so that after receiving detection feedback information sent by at least one user equipment, the base station obtains all identifiers of Z beams carried in the detection feedback information, determines, in the Z beams, Z1 beams that need to be adjusted, and adjusts, for at least one time, Z1 antenna bays corresponding to the Z1 beams, wherein Z is a positive integer greater than or equal to m, and Z1 is a positive integer less than or equal to Z.

9. The method according to claim 8, wherein the detection feedback information further comprises channel quality information of the m beams, and the performing, according to the channel detection information, detection on M beams covering the user equipment comprises:

detecting, in the M beams, a beam that meets a signal transmission condition of the user equipment, wherein the identifiers of the m beams comprise an identifier of the beam that meets the signal transmission condition of the user equipment.

10. The method according to claim 8, wherein the detection feedback information further comprises channel quality information of the m beams, and the performing, according to the channel detection information, detection on M beams covering the user equipment comprises:

detecting, in the M beams, at least two beams whose signal-to-noise ratio SNR difference falls within a preset range, wherein the identifiers of the m beams comprise identifiers of the at least two beams whose signal-to-noise ratio SNR difference falls within the preset range.

11. The method according to claim 8, wherein the detection feedback information further comprises channel quality information of the m beams, and the performing, according to the channel detection information, detection on M beams covering the user equipment comprises:

detecting, in the M beams, a beam whose signal-to-noise ratio SNR is less than a signal transmission threshold $SNR^{thd}$, wherein the identifiers of the m beams comprise an identifier of the beam whose signal-to-noise ratio SNR is less than the signal transmission threshold $SNR^{thd}$.

12. A base station, comprising:
a processor; and
a non-transitory computer-readable medium, the non-transitory computer-readable medium having processor-executable instructions stored thereon, the process-executable instructions, when executed by the process, facilitating the following:

sending beam information by using multiple beams, wherein the beam information comprises a beam identifier and channel detection information that correspond to a beam, so that user equipment performs, according to the channel detection information, detection on a beam covering the user equipment, to obtain detection feedback information;

receiving the detection feedback information sent by at least one user equipment;

obtaining identifiers of Z beams carried in the detection feedback information, wherein Z is a positive integer greater than or equal to 1;

determining, in the Z beams, Z1 beams that need to be adjusted, wherein Z1 is a positive integer less than or equal to Z; and adjusting, for at least one time, Z1 antenna bays corresponding to the Z1 beams.

13. The base station according to claim 12, wherein the Z beams comprise a beam that meets a signal transmission condition of the user equipment, and the detection feedback information comprises channel quality information of the Z beams; and wherein the processor-executable instructions, when executed by the processor, facilitate:

determining, in the Z beams according to the identifiers of the Z beams and the channel quality information of the Z beams, the Z1 beams that need to be adjusted due to overlapping coverage, wherein multiple beams that meet the signal transmission condition of the user equipment and that can be received by the user equipment overlap with each other in terms of coverage.

14. The base station according to claim 12, wherein the Z beams comprise at least two beams whose signal-to-noise ratio (SNR) difference falls within a preset range, and the detection feedback information comprises channel quality information of the Z beams: and wherein the processor-executable instructions, when executed by the processor, facilitate:

determining, in the Z beams according to the identifiers of the Z beams and the channel quality information of the Z beams, the Z1 beams that need to be adjusted due to inter-beam interference, wherein inter-beam interference exists between the at least two beams whose signal-to-noise ratio SNR difference falls within the preset range and that can be received by the user equipment.

15. The base station according to claim 12, wherein the processor-executable instructions, when executed by the processor, facilitate:

if the Z1 antenna bays are adjacent to each other, combine array elements of the Z1 antenna bays into a joint antenna bay, and generate a joint beam by using the joint antenna bay.

16. The base station according to claim 12, wherein the processor-executable instructions, when executed by the processor, facilitate:

if the Z1 antenna bays are adjacent to each other, reallocate array elements of the Z1 antenna bays to form U antenna bays with different beam widths, wherein U is a positive integer greater than or equal to 2.

17. User equipment, comprising:
a process; and
a non-transitory computer-readable medium, the non-transitory computer-readable medium having processor-executable instructions stored thereon, the processor-executable instructions, when executed by the processor, facilitating the following:

receiving beam information that is sent by a base station by using a beam, wherein the beam information comprises a beam identifier and channel detection information that correspond to the beam;

performing, according to the channel detection information, detection on M beams covering the user equipment, to obtain detection feedback information, wherein the detection feedback information comprises identifiers of m beams, and m is a positive integer that is greater than or equal to 1 and less than or equal to M; and sending the detection feedback information to the base station, so that after receiving detection feedback information sent by at least one user equipment, the base station obtains all identifiers of Z beams carried in the detection feedback information, determines, in the Z beams, Z1 beams that need to be adjusted, and adjusts, for at least one time, Z1 antenna bays corresponding to the Z1 beams, wherein Z is a positive integer eater than or equal to m, and Z1 is a positive integer less than or equal to Z.

18. The user equipment according to claim 17, wherein the detection feedback information further comprises channel quality information of the m beams, and wherein the processor-executable instructions, when executed by the processor, facilitate:

detecting, in the M beams, a beam that meets a signal transmission condition of the user equipment, wherein the identifiers of the m beams comprise an identifier of the beam that meets the signal transmission condition of the user equipment.

19. The user equipment according to claim 17, wherein the detection feedback information further comprises channel quality information of the m beams, and wherein the processor-executable instructions, when executed by the processor, facilitate:

detecting, in the M beams, at least two beams whose signal-to-noise ratio SNR difference falls within a preset range, wherein the identifiers of the m beams comprise identifiers of the at least two beams whose signal-to-noise ratio SNR difference falls within the preset range.

20. The user equipment according to claim 17, wherein the detection feedback information further comprises channel quality information of the m beams, and wherein the processor-executable instructions, when executed by the processor, facilitate:

detecting, in the M beams, a beam whose signal-to-noise ratio SNR is less than a signal transmission threshold $SNR^{thd}$, wherein the identifiers of the m beams comprise an identifier of the beam whose signal-to-noise ratio SNR is less than the signal transmission threshold $SNR^{thd}$.

* * * * *

UNITED STATES PATENT AND TRADEMARK OFFICE
CERTIFICATE OF CORRECTION

PATENT NO. : 10,200,880 B2  
APPLICATION NO. : 15/468525  
DATED : February 5, 2019  
INVENTOR(S) : Rong Wen et al.

Page 1 of 1

It is certified that error appears in the above-identified patent and that said Letters Patent is hereby corrected as shown below:

In the Claims

Column 27, Line 63 (approx.), In Claim 1, after "equal to" delete "Z:" and insert -- Z; --, therefor.

Column 30, Line 27 (approx.), In Claim 14, after "information of the" delete "Z beams:" and insert -- Z beams; --, therefor.

Column 31, Line 11, In Claim 17, delete "eater" and insert -- greater --, therefor.

Signed and Sealed this  
Eighth Day of October, 2019

Andrei Iancu  
*Director of the United States Patent and Trademark Office*